United States Patent
Hirzallah et al.

(10) Patent No.: US 11,973,558 B2
(45) Date of Patent: Apr. 30, 2024

(54) NARROW BEAM-BASED CHANNEL ACCESS

(71) Applicant: QUALCOMM Incorporated, San Diego, CA (US)

(72) Inventors: Mohammed Ali Mohammed Hirzallah, San Diego, CA (US); Arumugam Chendamarai Kannan, San Diego, CA (US); Srinivas Yerramalli, San Diego, CA (US); Marco Papaleo, Bologna (IT); Vinay Chande, San Diego, CA (US); Giovanni Chisci, San Diego, CA (US); Aleksandar Damnjanovic, Del Mar, CA (US); Jing Sun, San Diego, CA (US); Rajat Prakash, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/449,012

(22) Filed: Sep. 27, 2021

(65) Prior Publication Data
US 2023/0093991 A1 Mar. 30, 2023

(51) Int. Cl.
*H04B 7/06* (2006.01)
*H04B 17/309* (2015.01)
*H04W 24/10* (2009.01)

(52) U.S. Cl.
CPC ........ *H04B 7/0632* (2013.01); *H04B 7/0617* (2013.01); *H04B 17/309* (2015.01); *H04W 24/10* (2013.01)

(58) Field of Classification Search
CPC .. H04B 7/0632; H04B 7/0617; H04B 17/309; H04B 17/102; H04B 17/253;
(Continued)

(56) References Cited

U.S. PATENT DOCUMENTS

| 6,021,329 A | * | 2/2000 | Kornestedt | ........... H04W 24/08 455/448 |
| 2005/0047347 A1 | * | 3/2005 | Lee | ........................ H04L 1/20 370/241 |

(Continued)

FOREIGN PATENT DOCUMENTS

WO WO-2019226028 A1 * 11/2019 ........... H04B 7/0404

*Primary Examiner* — Tejis Daya
(74) *Attorney, Agent, or Firm* — QUALCOMM Incorporated

(57) ABSTRACT

A method of wireless communication performed by a wireless communications device may include receiving, from a second wireless communication device, one or more signals associated with a beam parameter, determining, for each of a plurality of locations within a first zone, a first signal measurement for the one or more received signals, determining, at each of a plurality of locations within a second zone, a second signal measurement for the one or more received signals, wherein the second zone is different from the first zone, and determining whether the second wireless communication device satisfies an interference condition based at least in part on a cumulative distribution of at least one of the first signal measurements at the plurality of locations within the first zone or a cumulative distribution of at least one of the second signal measurements at the plurality of locations within the second zone.

19 Claims, 13 Drawing Sheets

(58) Field of Classification Search
CPC ..... H04B 17/26; H04B 17/345; H04W 24/10; H04W 52/42; H04W 24/08; H04W 48/16
See application file for complete search history.

(56) References Cited

U.S. PATENT DOCUMENTS

| | | | |
|---|---|---|---|
| 2009/0322621 A1* | 12/2009 | Inanoglu | H04B 7/10 343/702 |
| 2014/0307654 A1* | 10/2014 | Kim | H04W 72/542 370/329 |
| 2017/0303278 A1* | 10/2017 | Calin | H04B 7/022 |
| 2019/0081688 A1* | 3/2019 | Deenoo | H04L 5/005 |
| 2019/0104416 A1* | 4/2019 | Yerramalli | H04W 72/20 |
| 2020/0252806 A1* | 8/2020 | Yerramalli | H04W 72/046 |
| 2021/0266914 A1* | 8/2021 | Yoo | H04L 5/0025 |
| 2022/0248246 A1* | 8/2022 | Berliner | H04L 5/0048 |

\* cited by examiner

NARROW BEAM-BASED CHANNEL ACCESS

TECHNICAL FIELD

This application relates to wireless communication methods and systems, and more particularly to narrow beam-based channel access for communications in a wireless communication network operating over an unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices such as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For instance, NR is designed to provide a lower latency, a higher bandwidth or a higher throughput, and a higher reliability than LTE. NR is designed to operate over a wide array of spectrum bands, for instance, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For instance, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP. As use cases and diverse deployment scenarios continue to expand in wireless communication, channel access technique improvements described in the present disclosure may yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first wireless communication device may include receiving, from a second wireless communication device, one or more signals associated with a beam parameter; determining, for each of a plurality of locations within a first zone, a first signal measurement for the one or more received signals; determining, at each of a plurality of locations within a second zone, a second signal measurement for the one or more received signals, wherein the second zone is different from the first zone; and determining whether the second wireless communication device satisfies an interference condition based at least in part on a cumulative distribution of at least one of the first signal measurements at the plurality of locations within the first zone or a cumulative distribution of at least one of the second signal measurements at the plurality of locations within the second zone.

In an additional aspect of the disclosure, a method of wireless communication performed by a wireless communication device may include selecting a channel access configuration for transmitting a communication signal in an unlicensed frequency band using a transmission beam, wherein the selecting is based at least in part on a cumulative distribution of first signal measurements at each of a plurality of locations within a first zone or a cumulative distribution of second signal measurements at each of a plurality of locations within a second zone; and transmitting, based on the channel access configuration and using the transmission beam, the communication signal in the unlicensed frequency band.

In an additional aspect of the disclosure, a first wireless communication device may include a memory; a transceiver; and at least one processor coupled to the memory and the transceiver, wherein the first wireless communication device is configured to receive, from a second wireless communication device, one or more signals associated with a beam parameter; determine, for each of a plurality of locations within a first zone, a first signal measurement for the one or more received signals; determine, at each of a plurality of locations within a second zone, a second signal measurement for the one or more received signals, wherein the second zone is different from the first zone; and determine whether the second wireless communication device satisfies an interference condition based at least in part on a cumulative distribution of at least one of the first signal measurements at the plurality of locations within the first zone; or a cumulative distribution of at least one of the second signal measurements at the plurality of locations within the second zone.

In an additional aspect of the disclosure, a wireless communication device may include a memory; a transceiver; and at least one processor coupled to the memory and the transceiver, wherein the wireless communication device is configured to select a channel access configuration for transmitting a communication signal in an unlicensed frequency band using a transmission beam based at least in part on a cumulative distribution of first signal measurements at each of a plurality of locations within a first zone; or a cumulative distribution of second signal measurements at each of a plurality of locations within a second zone; and transmit, based on the channel access configuration and using the transmission beam, the communication signal in the unlicensed frequency band.

Other aspects and features will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
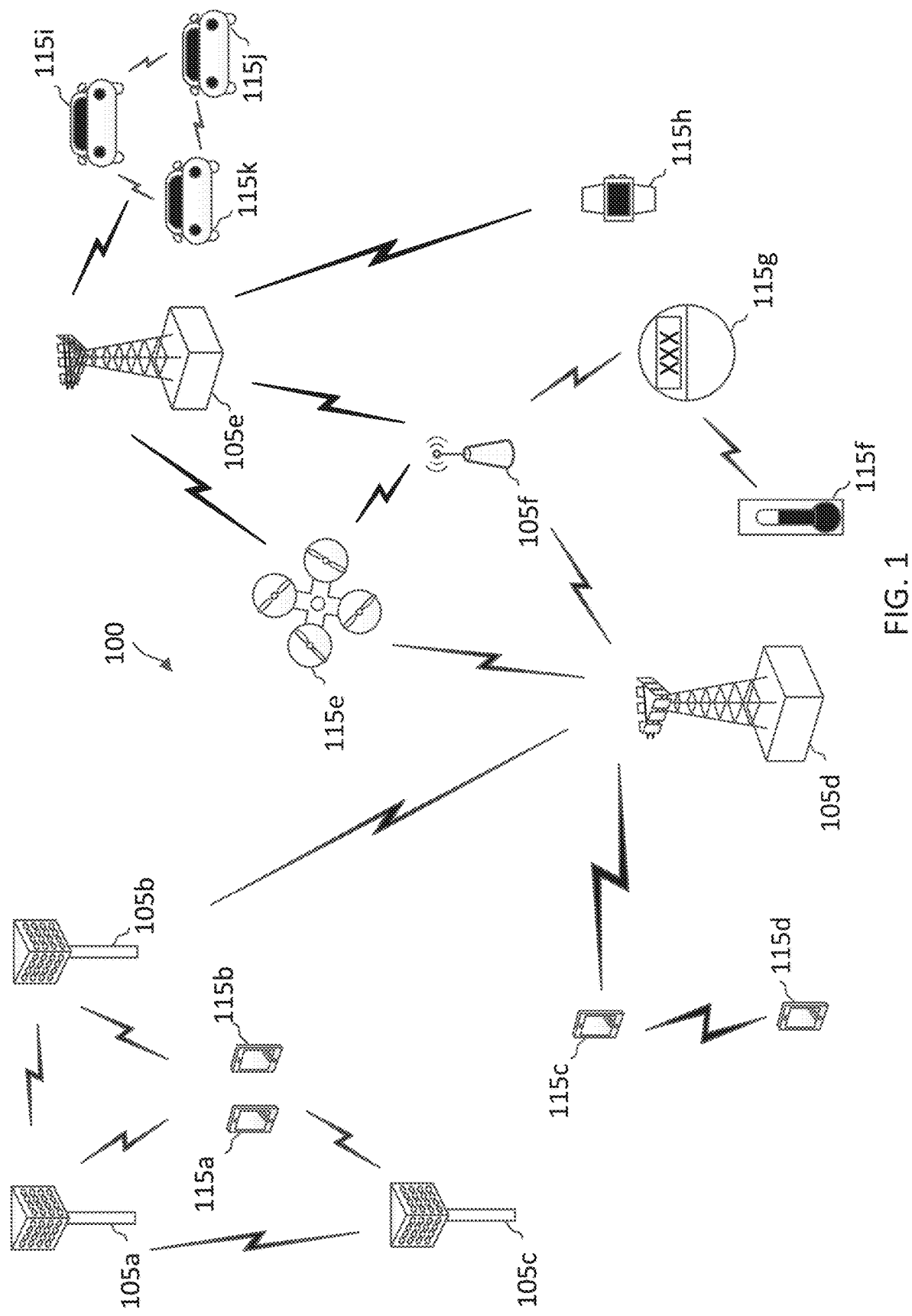
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, a listen-before-talk (LBT) procedure may be used to assess whether a shared channel is clear before transmitting a signal in the channel. During the LBT procedure, a device may perform a clear channel assessment (CCA) for a predetermined duration to contend for a channel occupancy time (COT). During the CCA, the device may compare the energy level detected in the channel to a threshold value. If the energy level exceeds the threshold, then the device may determine that the channel is occupied, refrain from transmitting a signal in the channel, and repeat the CCA after a period of time, or the device may reduce its transmit power to avoid interfering with other devices that may be using the channel. If the energy level is below the threshold, then the device may determine that the channel is unoccupied (indicating the device won the contention) and proceed with transmitting a signal in the COT.

The unlicensed spectrum that is available for wireless communications may include 5 gigahertz (GHz) bands, 6 GHz bands, 60 GHz bands, and/or other bands. In some instances, aspects of LBT in the 60 GHz bands may be based on standards promulgated by the European Telecommunications Standards Institute (ETSI). To that end, in a first operating mode, a mobile or fixed wireless communication device or node may perform an LBT prior to accessing an unlicensed band in the 60 GHz range. However, performing an LBT prior to each and every transmission can be an inefficient use of resources as a result of the overhead and delays associated with the LBT. Further, a device or node communicating over a 60 GHz or other frequency band may use beamformed signals to compensate the high signal attenuation associated with the frequency band. A beamformed signal may focus its signal energy in a specific beam direction towards an intended receiver such that multiple transmitters can transmit at the same time in different spatial directions without interfering with each other and/or with minimal interference. Accordingly, in a second operating mode, a mobile or fixed wireless communication device or node may transmit without performing an LBT if the device or node satisfies an interference condition or uses a certain antenna gain for the transmission. In some instances, antenna gain may be correlated to a transmission beam width. For instance, a high antenna gain may produce a narrower beam than a lower antenna gain. That is, the second operating mode may allow a device to skip LBT when a transmission is transmitted using a narrow transmission beam. While utilizing a high antenna gain to generate a narrow beam for transmission and/or reception can reduce the likelihood of collisions, beam collisions can occur and there may be no detection or mitigation of interference/collisions when an LBT is not performed.

In some instances of the present disclosure, a transmitting node may perform long-term sensing in addition to LBT to mitigate beam collision. For long-term sensing, a transmitting node may monitor for interference in a shared channel over a period of time, for instance, across multiple transmission periods or COTs (e.g., at periodic measurement occasions) instead of performing sensing only when there is data ready for transmission. In further instances, a transmitting node may combine LBT and/or long-term sensing with other coexistence techniques (e.g., setting a limit to the beam-width of a transmission beam, setting a limit for a transmit power, setting a limit for a duty cycle (e.g., a transmission to be within D % of total time), and/or setting a limit for beam dwell time (e.g., a maximum transmission duration along a certain beam direction)) to further mitigate beam collision and/or interference.

As used herein, the term "transmission beam" may refer to a transmitter transmitting a beamformed signal in a certain spatial direction or beam direction and/or with a certain beam width covering a certain spatial angular sector. The transmission beam may have characteristics such as the beam direction and the beam width. The term "reception beam" may refer to a receiver using beamforming to receive a signal from a certain spatial direction or beam direction and/or within a certain beam width covering a certain spatial angular sector. The reception beam may have characteristics such as the beam direction and the beam width.

In certain aspects, a transmitting node may utilize one set of channel access procedures (e.g., without an LBT and/or long-term sensing) for channel access when the transmitting node utilizes a transmission beam that satisfies a narrow beam condition. The transmitting node may utilize another, different set of channel access procedures for channel access when the transmitting node utilizes a transmission beam that fails to satisfy the narrow beam condition. That is, narrow-beam based channel access in accordance with the present disclosure can operate based on a narrow transmission beam causing limited interference to surrounding nodes. Accordingly, in some instances one or more metrics may be utilized to determine the narrowness of a transmission beam. The narrowness of a beam as discussed herein may be based on an associated interference level. Accordingly, the narrowness of a beam may not be limited to geometrical properties (e.g., beam width and/or angular sector) of the beam but may also include the interference footprint of the beam on a network level. For instance, a transmission beam with a wider beamwidth, but with a lower gain and/or a lower transmit power may be considered as narrower in terms of its interference to surrounding nodes of the network than a transmission beam with a narrower beamwidth, but with a higher gain and/or higher transmit power in some aspects.

The present disclosure provides techniques for determining whether a wireless communication device (e.g., a UE, a BS) satisfies an interference condition. In some instances, whether the wireless communication device satisfies the interference condition is based on a narrow beam condition. The narrow beam condition may be based on a comparison of a cumulative distribution of signal measurements of a transmission beam of the wireless device at a plurality of locations within an intended zone and within an unintended zone. The intended zone may be a zone in which the transmission beam is directed towards an intended wireless communication device. The unintended zone may be a zone in which the transmission beam is directed towards an unintended wireless communication device. The unintended zone may be a zone outside of the intended zone (e.g., a zone surrounding the intended zone, a zone adjacent to the intended zone). As will be described in detail with reference to FIGS. 5-9, the cumulative distribution of the signal measurements of the transmission beam of the wireless device may be based on signal measurements made at a number of locations associated with a coverage zone of the wireless communication device (e.g., a device under test). For instance, the location where the measurements are made may be associated with a respective azimuth angle and a respective elevation angle of a spherical coverage zone with respect to the location and/or positioning of the wireless communication device within the spherical coverage zone. The signal measurements may include determining an effective isotropic radiated power (EIRP) for the received signal at the locations of the spherical coverage zone, within both the intended zone and the unintended zone. Determining whether the transmission beam of the wireless device satisfies an interference condition may be achieved using any suitable technique. For instance, determining whether the wireless communication device satisfies the interference condition may include determining whether a difference between a k-th percentile signal measurement of the signal measurements and a k-th percentile of the reference probability distribution satisfies a threshold. The reference probability distribution may satisfy a narrow beam condition and therefore satisfy the interference condition. In some instances, additional comparisons may be performed to determine whether the wireless communication device satisfies the interference condition. For instance, determining whether a difference between the k-th percentile signal measurement of the signal and a k-th percentile of the reference probability distribution is less than a first threshold and/or determining whether a difference between a j-th percentile signal measurement of the signal measurements and a j-th percentile of the reference probability distribution is less than a second threshold. In this case, the value of k may be greater than a value of j.

In some aspects, determining whether the wireless communication device satisfies the interference condition may include determining whether a k-th percentile signal measurement of the signal measurements within the intended zone (e.g., a first zone) satisfies a first threshold and/or determining whether the k-th percentile signal measurement of the signal measurements within the unintended zone (e.g., a second zone) satisfies a second threshold. The first threshold may be based on a size of the intended zone and the second threshold may be based on a size of the unintended zone.

In some aspects, determining whether the wireless communication device satisfies the interference condition may include determining whether an antenna gain satisfies the narrow beam condition. Determining whether an antenna gain satisfies the narrow beam condition may include determining whether a k-th percentile signal measurement of the signal measurements minus an offset within the intended zone (e.g., a first zone) satisfies a first threshold and/or determining whether the k-th percentile signal measurement of the signal measurements minus an offset within the unintended zone (e.g., a second zone) satisfies a second threshold. The offset may include a transmit power of the one or more signals.

In some aspects, determining whether the wireless communication device satisfies the interference condition may include determining whether a difference between a k-th percentile signal measurement and a j-th percentile of the signal measurements at the plurality of locations within the intended zone satisfies a first threshold and/or determining whether an i-th percentile signal measurement of the signal measurements minus an offset at the plurality of locations within the intended zone satisfies a second threshold. The value of k may be greater than a value of j.

In some aspects, determining whether the wireless communication device satisfies the interference condition may include determining whether a difference between a k-th percentile signal measurement and a j-th percentile of the signal measurements at the plurality of locations within the unintended zone satisfies a first threshold and/or determining whether an i-th percentile signal measurement of the signal measurements minus an offset at the plurality of locations within the unintended zone satisfies a second threshold. The value of k may be greater than a value of j.

In some aspects, determining whether the wireless communication device satisfies the interference condition may include determining whether a difference between a k-th percentile signal measurement and a j-th percentile of the signal measurements at the plurality of locations within the intended zone satisfies a first threshold, determining whether an i-th percentile signal measurement of the signal measurements minus an offset at the plurality of locations within the intended zone satisfies a second threshold, determining whether a difference between a y-th percentile signal measurement and a x-th percentile of the signal measurements at the plurality of locations within the unintended zone satisfies a first threshold, and/or determining whether a z-th percentile signal measurement of the signal measurements minus an offset at the plurality of locations within the unintended zone satisfies a second threshold. The value of k may be greater than a value of j. The value of y may be greater than a value of x.

In some aspects, determining whether the wireless communication device satisfies the interference condition may include determining whether a difference between a k-th percentile signal measurement of the signal measurements at the plurality of locations within the intended zone and a j-th percentile signal measurement of the signal measurements at the plurality of locations within the unintended zone satisfies a threshold.

In some instances, determining whether the wireless communication device satisfies the interference condition may be based on operating parameters and/or conditions of the wireless device. For instance, the comparison thresholds and/or the reference probability distribution may be based on operating parameters (e.g., frequency of operation, mobility conditions, type of wireless device, device power class, class of service, interference conditions, etc.) and/or network conditions (e.g., density of wireless devices in the area of the wireless device, size of the intended zone, size of the unintended zone, etc.). The reference probability distribution associated with the intended zone may be the same or different from the reference probability associated with the unintended zone.

Aspects of the present disclosure can provide several benefits. For instance, if a wireless device satisfies the inference condition, the probability that the wireless device will interfere with other nodes (e.g., other wireless devices) in the area may be reduced. The interference may be low enough that the wireless device may implement channel access methods that reduce latency and overhead and/or reduce power consumption. For instance, if the wireless device satisfies the inference condition, the wireless device may refrain from performing an LBT and/or long-term sensing before accessing the channel.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, For instance, about 10. Each slot may be further divided into mini-slots. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

In some aspects, the network 100 may operate over a shared channel, which may include shared frequency bands and/or unlicensed frequency bands. For instance, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For instance, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for instance, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a mmWave band (e.g., at 60 GHz). Due to the high pathloss in the mmWave band, the BSs 105 and the UEs 115 may utilize directional beams to communicate with each other. For instance, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. In general, a BS 105 and/or a UE 115 may be capable of generating a transmission beam for transmission or a reception beam for reception in various spatial direction or beam directions.

Figure 2:
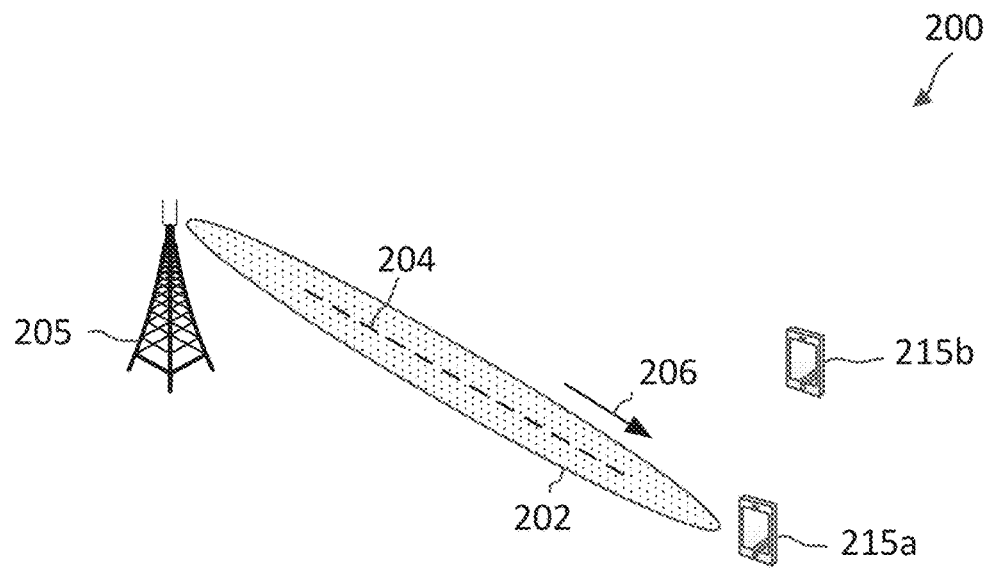
FIG. 2 illustrates a communication scenario according to some aspects of the present disclosure.

FIG. 2 illustrates a communication scenario 200 according to aspects of the present disclosure. The communication scenario 200 may correspond to a communication scenario among BSs 105 and or UEs 115 in the network 100. For simplicity, FIG. 2 illustrates one BS 205 and two UEs 215 (shown as 215a and 215b), but a greater number of UEs 215 (e.g., about 3, 4, 5, 6, 7, 8, 9, 10, or more) and/or BSs 205 (e.g., about 2, 3, 4 or more) may be supported. The BS 205 and the UEs 215 may be similar to the BSs 105 and the UEs 115, respectively.

In the scenario 200, the BS 205 may serve the UE 215a. In some instances, the UE 215b may be served by the BS 205. In other instances, the UE 215b may be served by another BS (e.g., another BS 105 or 205). In such instances, the UE 215b and the other BS can be operated by the same network operating entity as the BS 205 or a different network operating entity than the BS 205 Further, in some instances, the UE 215b and the other BS may utilize the same RAT as the BS 205 and the UE 215a. In other instances, the UE 215b and the other BS may utilize a different RAT than the BS 205 and the UE 215a. For instance, the BS 205 and the UE 215a may be NR-U devices, and the other BS and the UE 215b may be WiFi devices. NR-U may refer to the deployment of NR over an unlicensed spectrum.

The BSs 205 and the UEs 215 may communicate over a mmWave band. The mmWave band may be at any mmWave frequencies (e.g., at 20 GHz, 30 GHz, 60 GHz or higher). As explained above, the high mmWave frequencies may have a high pathloss, and a device operating over such frequencies may use beamforming for transmission and/or reception to compensate for the high signal attenuation. For instance, the BS 205 may be capable of generating a number of directional transmission beams in a number of beam and/or spatial directions (e.g., about 2, 4, 8, 16, 32, 64, or more) and may select a certain transmission beam or beam direction to communicate with the UE 215a based on the location of the UE 215a in relation to the location of the BS 205 and/or any other environmental factors such as signal scatterers in the surrounding area. For instance, the BS 205 may select a transmission beam that provides a high receive signal strength for communication with the UE 215a. The UE 215a may also be capable of generating a number of directional transmission beams in a number of beam and/or spatial directions (e.g., about 2, 4, 8, or more) and may select a certain transmission beam that provides the highest receive signal strength to communicate with the BS 205. In some instances, the BS 205 and the UE 115a may perform a beam selection procedure with each other to determine a best UL beam and a best DL beam for communications.

In the example of FIG. 2, the BS 205 may transmit a transmission to the UE 215a using a transmission beam 202 in a direction 206 along a line-of-sight (LOS) path 204, and the UE 215a may use a reception beam in the reverse direction (of the direction 206) to receive the transmission. The transmission beam 202 may be a narrow transmission beam.

As explained above, narrow beam transmissions may be used as a coexistence mechanism for spectrum sharing since the transmission beam may focus the transmission signal energy in a specific beam direction, and thus may be less likely to interfere with transmissions and/or receptions of neighboring devices.

Figure 3:
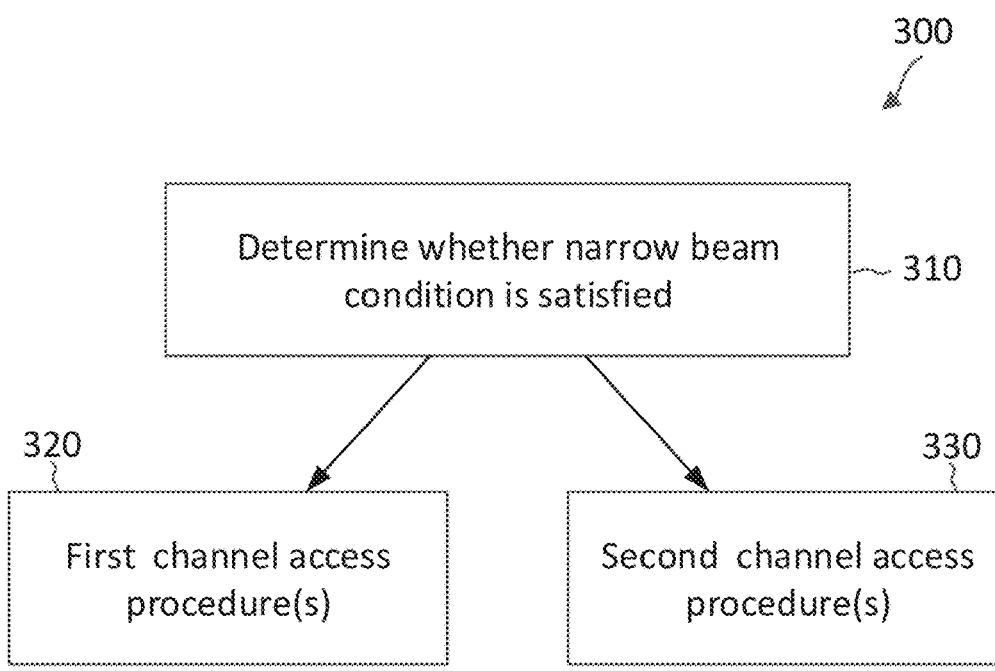
FIG. 3 illustrates a channel access method according to some aspects of the present disclosure.

FIG. 3 illustrates a channel access method 300 according to some aspects of the present disclosure. The method 300 may be employed by BSs such as the BSs 105 and/or 205 and/or UEs such as the UEs 115 and/or 215. In particular, a wireless communication device (e.g., a BS or a UE) may determine which channel access procedure(s) to use for channel access in an unlicensed band, for instance, in the mmWave range or sub-THz range, using the method 300.

At 310, a wireless communication device (e.g., a BS 105, 205 or a UE 115, 215) may determine whether a narrow beam condition is satisfied. For instance, the wireless communication device may determine whether a beam characteristic of a transmission beam to be used for an upcoming transmission satisfies (e.g., less than) a certain threshold. For instance, techniques for determining whether a wireless communication device (e.g., a BS 105, 205 or a UE 115, 215) satisfies an interference condition (e.g., a narrow beam condition) may be based on a comparison of a cumulative distribution of signal measurements of a transmission beam of the wireless device in an intended zone and a cumulative distribution of signal measurements of a transmission beam of the wireless device in an unintended zone. In some aspects, the wireless communication device may determine whether a beam width (e.g., a half-power beam width) of the beam satisfies a threshold. Additionally or alternatively, the wireless communication device may determine whether a transmit power of the beam satisfies a threshold. For instance, if the transmit power of the beam is less than a threshold value (e.g., less than 10 dBm, less than 15 dBm, less than 20 dBm), then the narrow beam condition may be satisfied. Additionally or alternatively, the wireless communication device may determine whether a beam dwell time or a duty cycle of the beam satisfies a threshold. For instance, the transmission beam may satisfy the narrow beam condition if the beam width is less than a certain threshold in the first and/or second zone, if the transmit power is less than a certain threshold, and/or if the beam dwell time is less than a certain threshold. Conversely, the transmission beam may fail to satisfy the narrow beam condition if the beam width exceeds a certain threshold in the first and/or second zone, if the transmit power exceeds a certain threshold, and/or if the beam dwell time exceeds a certain threshold.

At 320, if the narrow beam condition is satisfied, the wireless communication device may utilize a first set of channel access procedures. In some aspects, the first set of channel access procedures may include a channel access without performing an LBT and/or long-term sensing. In some aspects, the first set of channel access procedures may also include various restrictions on the transmission power, the transmission duty cycle, and/or the beam dwell time that the wireless communication device may use.

If, however, the narrow beam condition is not satisfied, the wireless communication device may proceed to 330. At 330, the wireless communication device may utilize a second set of channel access procedures. In some aspects, the second set of channel access procedures may include a channel access after a successful LBT and/or a low interference detection from long-term sensing. In some aspects, the first set of channel access procedures may also include various restrictions on the transmission power, the transmission duty cycle, and/or the beam dwell time that the wireless communication device may use.

While utilizing the narrow beam condition as in the method 300 may reduce the likelihood of a beam collision, in some instances, a transmission beam may include main lobes and side lobes. For instance, a directional antenna array or elements may have an objective to emit a transmission beam (e.g., RF signals) in a specific direction. However, a directional antenna array or elements may also generate unwanted or undesired radiation in unintended zones and/or directions other than the intended zone and/or direction. That is, the transmission beam may have a main lobe in the intended direction and side lobe(s) in unintended directions. The main lobe may be configured to have a large field strength than the other side lobe(s). Accordingly, a transmission beam can cause interference in directions other than the intended direction that the transmission beam is directed to as will be discussed below with reference to FIG. 4.

Figure 4:
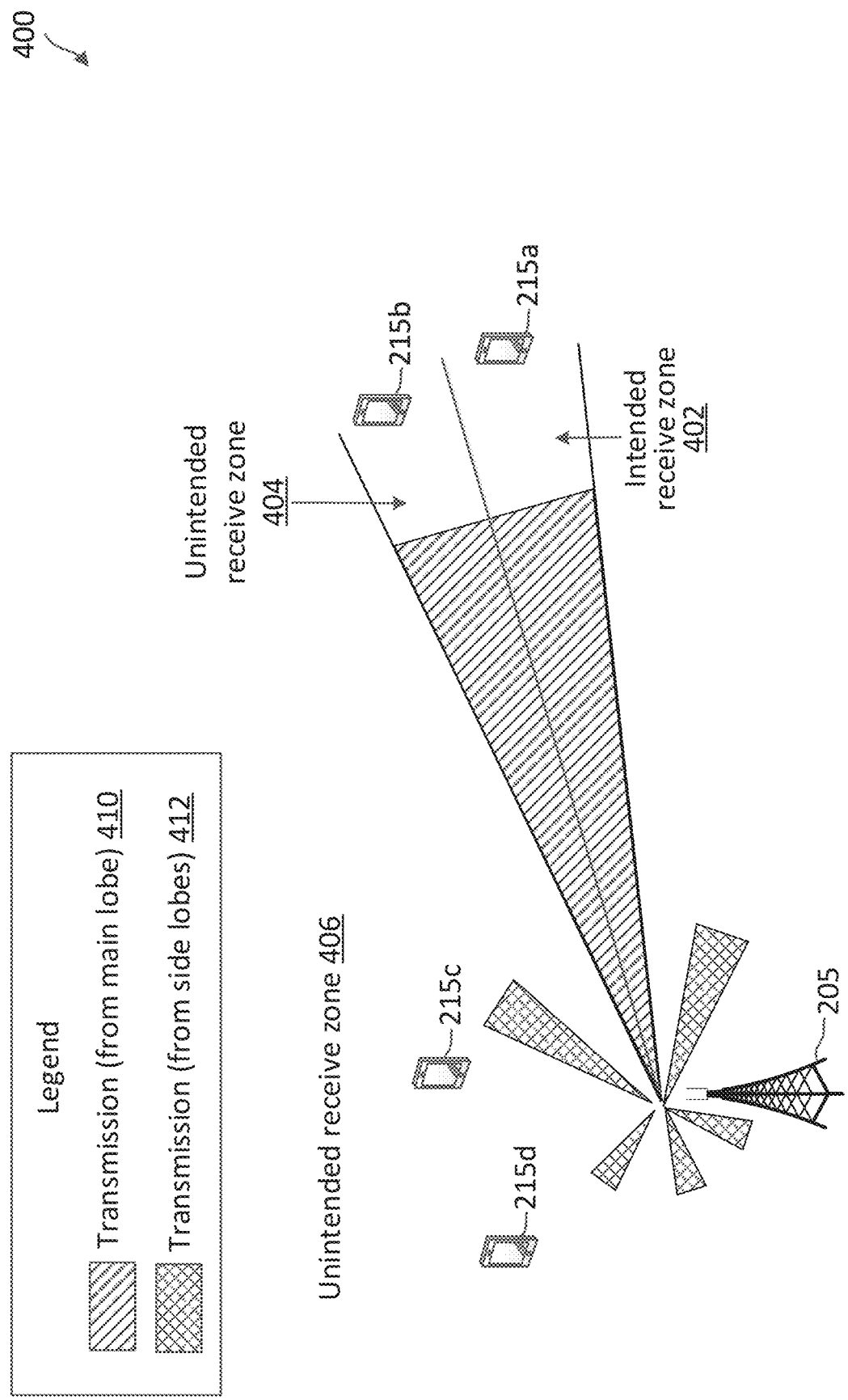
FIG. 4 illustrates a communication scenario according to some aspects of the present disclosure.

FIG. 4 illustrates a communication scenario 400 according to some aspects of the present disclosure. The communication scenario 400 may correspond to a communication scenario among BSs 105 and or UEs 115 in the network 100. For simplicity, FIG. 4 illustrates one BS 205 and four UEs 215 (shown as 215a, 215b, 215c, and 215d), but a greater number of UEs 215 (e.g., about 3, 4, 5, 6, 7, 8, 9, 10, or more) and/or BSs 205 (e.g., about 2, 3, 4, or more) may be supported. The BS 205 and the UEs 215 may be similar to the BSs 105 and the UEs 115, respectively.

The scenario 400 provides further illustration of interference in the communication scenario 200, where the BS 205 utilizes transmit beamforming to communicate with the UE 215a. As shown in FIG. 4, a transmission beam from the BS 205 directed to the UE 215a may include a main lobe and side lobes. The transmission from the main lobe is shown by the stripe-pattern filled shapes and may be referred to as transmission from main lobe 410. The transmission from the side lobes is shown by the criss-cross pattern filled shapes and may be referred to as transmission from side lobes 412. The transmission from the main lobe 410 may reach an intended receive (Rx) zone 402 at a far field where the UE 215a (the intended receiver) is located. Moreover, the transmission from the main lobe 410 may also reach an unintended receive (Rx) zone 404 at a far field where the UE 215b (an unintended receiver) is located. Further, the transmission from the side lobes 412 may reach an unintended receive (Rx) zone 406 where the UEs 215c and 215d (unintended receivers) are located.

While FIG. 2 and FIG. 4 illustrate the BS 205 utilizing a single transmission beam 202 to communicate with the UE 215a (a single user), aspects are not limited thereto. In general, a BS 205 may utilize analog and/or digital beamforming to communicate with a UE 215 in a variety of configurations. For instance, in some scenarios, a BS 205 may transmit a single data stream over a single transmission beam to a single UE 215. In some scenarios, a BS 205 may transmit multiple data streams over a single transmission beam to a single UE 215, for instance, in a single user-multiple-input-multiple-output (SU-MIMO) configuration. In some scenarios, a BS 205 may transmit multiple data streams over a single transmission beam, where each data stream is for a different UE 215, for instance, in a multiple user-multiple-input-multiple-output (MU-MIMO) configuration. In some scenarios, a BS 205 may transmit a single data stream over multiple transmission beams to a single UE 215. In some instances, a BS 205 may transmit multiple data streams over multiple transmission beams to a single UEs 215 (in a SU-MIMO configuration). In some scenarios, a BS 205 may transmit multiple data streams over multiple transmission beams to multiple UEs 215, where each UE 215 may receive one or more of the data streams (in a MU-MIMO configuration).

Depending on the transmit power of the transmission beam, the geometry of the main lobe 410 and/or side lobes 412 of the transmission beam, and/or the interference tolerance levels of the UEs (e.g., the UEs 215b, 215c, and/or 215d) located in the unintended receive zones 404 and 406, the transmission beam may interfere and/or degrade communications of those UEs in the unintended receive zones 404 and/or 406. Accordingly, the narrowness of a beam footprint in the context of interference may consider not only the specific direction from the transmission from the main lobe 410, but rather in all spatial directions including the side lobes 412.

As discussed above, wireless devices such as the BSs 105 and 205 and UEs 115 and 215 may apply analog and/or digital beamforming to direct an RF transmission in a direction towards a target receiver. Directing an RF transmission beam towards a specific direction may require narrowing the width of the beam. In some instances, narrowing the beam width may reduce interference to wireless devices outside the beam. FIGS. 5-8 below describe methods of measuring an RF transmission beam width. The width of the RF beam may determine the methods used by the wireless device to access the wireless channel.

Figure 5:
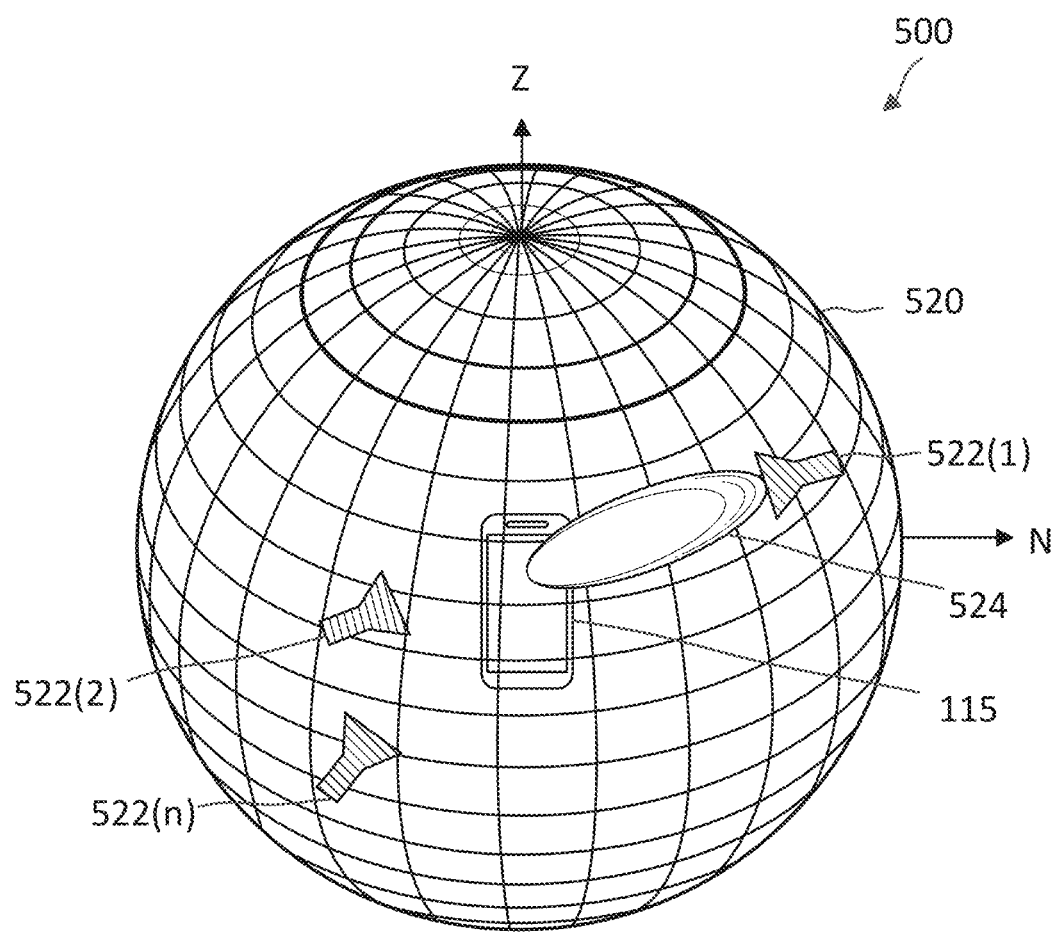
FIG. 5 illustrates a direct far field (DFF) measurement setup of a wireless device according to some aspects of the present disclosure.

FIG. 5 illustrates a direct far field (DFF) measurement setup 500 of a wireless device according to some aspects of the present disclosure. The measurement setup 500 may be employed by BSs such as the BSs 105, 205 and UEs such as the UEs 115, 215 in a network such as the network 100 for communications. The description of measurement setup 500 described below is directed to measuring RF radiated from a device under test (DUT) such as the UEs 115, 215. However, the present disclosure is not so limited and the measurement setup 500 may be applied to any wireless device. For instance, the measurement setup 500 may be applied to the BSs 105, 205. The measurement setup 500 may be applied to measuring a transmission beam 524 generated by the UE 115. For instance, the measurement setup 500 may measure the effective isotropic radiated power (EIRP) of the transmission beam 524 at multiple spatial locations with respect to the UE 115. In some instances, the EIRP may be measured according to the methods described in 3GPP specification TR 38.810.

In some instances, the measurement setup 500 may be configured as a sphere 520 as shown in FIG. 5. The measurement setup 500 may include a number of RF sensors (e.g., receive antennas and RF processors) 522(1) . . . 522(n) that are configured at a set of locations on sphere 520 (e.g., an intended zone and/or an unintended zone) to measure the EIRP (e.g., RF energy) radiated from the UE 115. As will be described in detail with reference to FIGS. 6 and 7 below, RF sensors 522(1) . . . 522(n) may be located (e.g., spatially distributed) on the sphere 520 using different spacing configurations. In some aspects, RF sensors 522(1) . . . 522(n) may include an array of discrete receive antennas and RF processors arranged in a sphere 520. In other aspects, RF sensors 522(1) . . . 522(n) may include an array of discrete receive antenna, RF frontends, and processors. In some instances, the RF sensors 522(1) . . . 522(n) may be part of a wireless device such as BSs 105, 205 or UEs 115, 215. The RF sensors 522(1) . . . 522(n) may record measurements of signals associated with transmission beam 524 in an intended zone and/or an unintended zone. The recorded measurements may be processed to determine whether the UE 115 satisfies an interference condition based on the recorded signal measurements. Each of the measurements may be recorded at a location on the sphere 520. For instance, each of the locations may be defined by an azimuth angle with respect to axis N and an elevation angle with respect to axis Z. The intended zone and unintended zone may be defined by a range of azimuth angles and elevation angles.

Figure 6A:
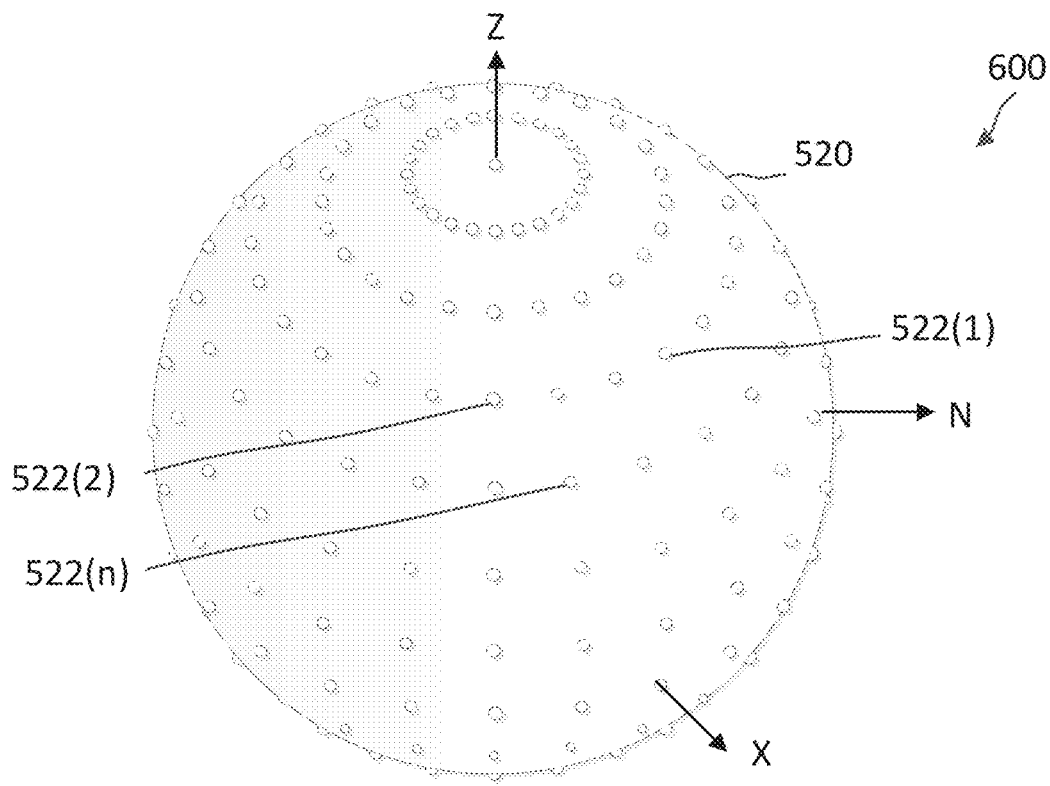
FIGS. 6A-6B illustrates a DFF measurement setup of a wireless device according to some aspects of the present disclosure.

FIG. 6A illustrates a direct far field (DFF) measurement setup 600 of a wireless device according to some aspects of the present disclosure. The measurement setup 600 may be employed by BSs such as the BSs 105, 205 and UEs such as the UEs 115, 215 in a network such as the network 100 for communications. The description of measurement setup 600 described below is directed to measuring RF radiated from a device under test (DUT) such as the UEs 115, 215. However, the present disclosure is not so limited and the measurement setup 600 may be applied to any wireless device. For instance, the measurement setup 600 may measure the EIRP of the transmission beam 524. In some instances, the measurement setup 600 may be spatially configured as a sphere 520 as shown in FIG. 6A. The measurement setup 600 may include a number of RF sensors (e.g., receive antennas and RF processors) 522(1) . . . 522(n) that are configured at a set of locations to measure the RF energy radiated from the wireless device.

Figure 6B:
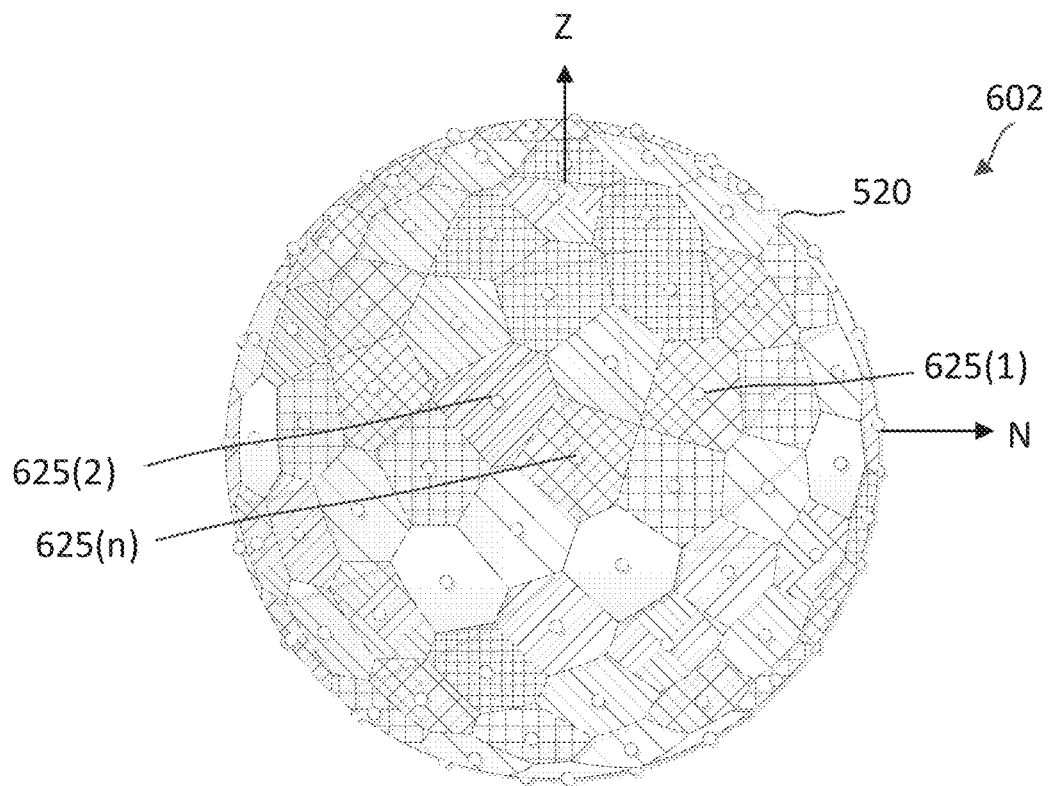

RF sensors 522(1) . . . 522(n) may be located on (e.g., distributed across) the surface of the sphere 520 in any spatial configuration. RF sensors 522(1) . . . 522(n) may include an array of discrete receive antennas and RF processors arranged in a sphere 520. Each of the measurements may be recorded at a location (e.g., an intended zone and/or an unintended zone) on the sphere 520. For instance, each of the locations may be defined by an azimuth angle with respect to axis N and an elevation angle with respect to axis Z (e.g., discrete elevation angles, each elevation angle defining the plane). In FIG. 6B, the constant step size grid has the azimuth and elevation angles uniformly distributed. For instance, the RF sensors 522(1) . . . 522(n) may be distributed in a uniform planar manner (e.g., constant step size) such that for each of the configured planes (X-N planes) along the Z axis. RF sensors 522(1) . . . 522(n) may be located within each configured plane (each configured plane having the same elevation angle) and having a different azimuth angle. The difference in the azimuth angle between RF sensors 522(1) . . . 522(n) may be the same (e.g., evenly spaced). In some instances, the RF sensors 522(1) . . . 522(n) may be part of a wireless device such as a BS 105, 205. The RF sensors 522(1) . . . 522(n) may record measurements (e.g., EIRP) of signals associated with a transmission beam (e.g., transmission beam 524). The recorded measurements may be processed to determine whether the wireless device (e.g., UE 115) satisfies an interference condition based on the recorded signal measurements.

FIG. 6B illustrates a direct far field (DFF) measurement setup 602 of a wireless device according to some aspects of the present disclosure. The measurement setup 602 may be employed by BSs such as the BSs 105, 205 and UEs such as the UEs 115, 215 in a network such as the network 100 for communications. The description of measurement setup 602 is directed to measuring RF radiated from a device under test (DUT) such as UEs 115, 215. However, the present disclosure is not so limited and the measurement setup 602 may be applied to any wireless device. For instance, the measurement setup 602 may be applied to BSs 105, 205. For instance, the measurement setup 602 may measure the EIRP of the transmission beam 524. In some instances, the measurement setup 602 may be configured as a sphere 520 as shown in FIG. 6B. The measurement setup 602 may include a number of RF sensors (e.g., receive antennas and RF processors) 522(1) . . . 522(n) that are configured at a set of locations to measure the RF energy radiated from the UE 115. Tiles 625(1) . . . 625(n) may represent the tiles (e.g., regions) within which RF sensors 522(1) . . . 525(n) respectively measure the RF parameters associated with the transmission beam (e.g., transmission beam 524) radiated from the wireless device. Tiles 625(1) . . . 625(n) may be shaped as polygons and configured as Voronoi regions.

Figure 7A:
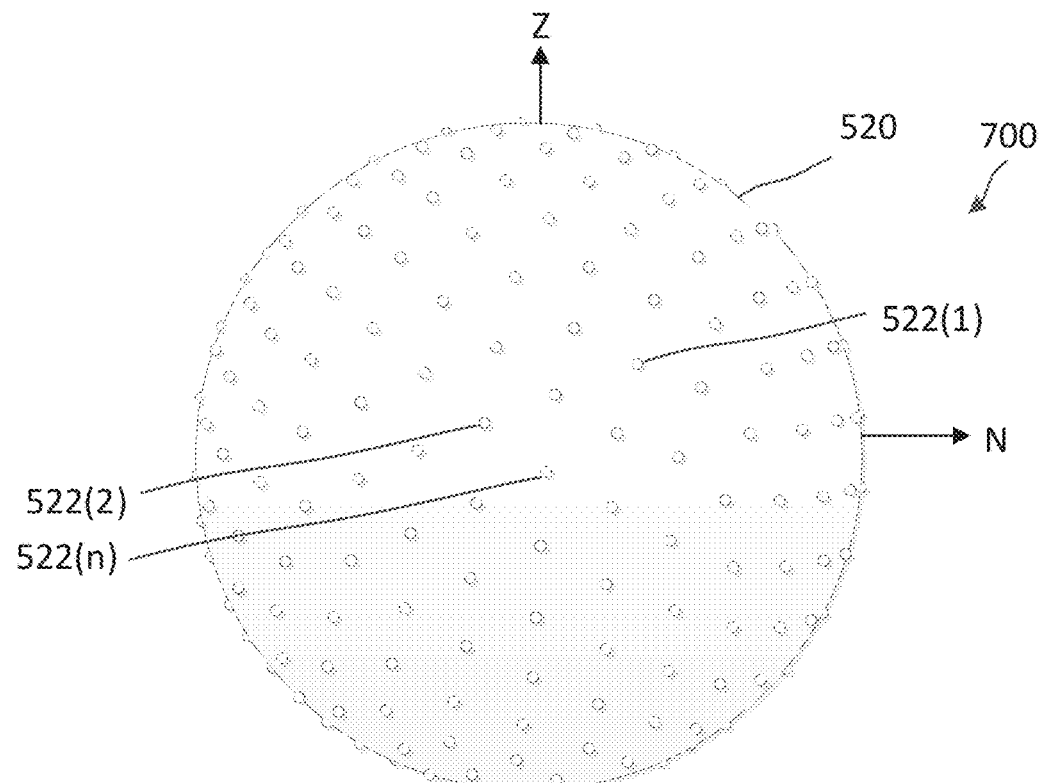
FIGS. 7A-7B illustrates a DFF measurement setup of a wireless device according to some aspects of the present disclosure.

FIG. 7A illustrates a direct far field (DFF) measurement setup 700 of a wireless device according to some aspects of the present disclosure. The measurement setup 700 may be employed by BSs such as the BSs 105, 205 and UEs such as the UEs 115, 215 in a network such as the network 100 for communications. The description of measurement setup 700 described below is directed to measuring RF radiated from a device under test (DUT) such as UEs 115, 215. However, the present disclosure is not so limited and the measurement setup 700 may be applied to any wireless device. For instance, the measurement setup 700 may be applied to BSs 105, 205. For instance, the measurement setup 700 may measure the EIRP of the transmission beam 524. In some instances, the measurement setup 700 may be spatially configured as a sphere 520 as shown in FIG. 7A. The measurement setup 700 may include a number of RF sensors (e.g., receive antennas and RF processors) 522(1) . . . 522(n) that are configured at a set of locations (e.g., an intended zone and/or an unintended zone) to measure the RF energy radiated from the UE 115.

RF sensors 522(1) . . . 522(n) may be located on (e.g., distributed across) the surface of the sphere 520. The measurement setup 700 may be configured similar to the measurement setup 600 with the difference being the arrangement in the location of the RF sensors 522(1) . . . 522(n). In contrast to the arrangement in FIG. 6A in which RF sensors 522(1) . . . 522(n) are arranged in a uniform planar manner such that for each plane in the Z axis, RF sensors 522(1) . . . 522(n) may be located within each plane having the same elevation angle and having a different azimuth angle, in FIG. 7A, the RF sensors 522(1) . . . 522(n) are arranged equidistant to one another on the surface of the sphere 520. The equidistant arrangement of the RF sensors 522(1) . . . 522(n) in FIG. 7A may provide a more uniform measurement of the transmission beam within the sphere 520.

Figure 7B:
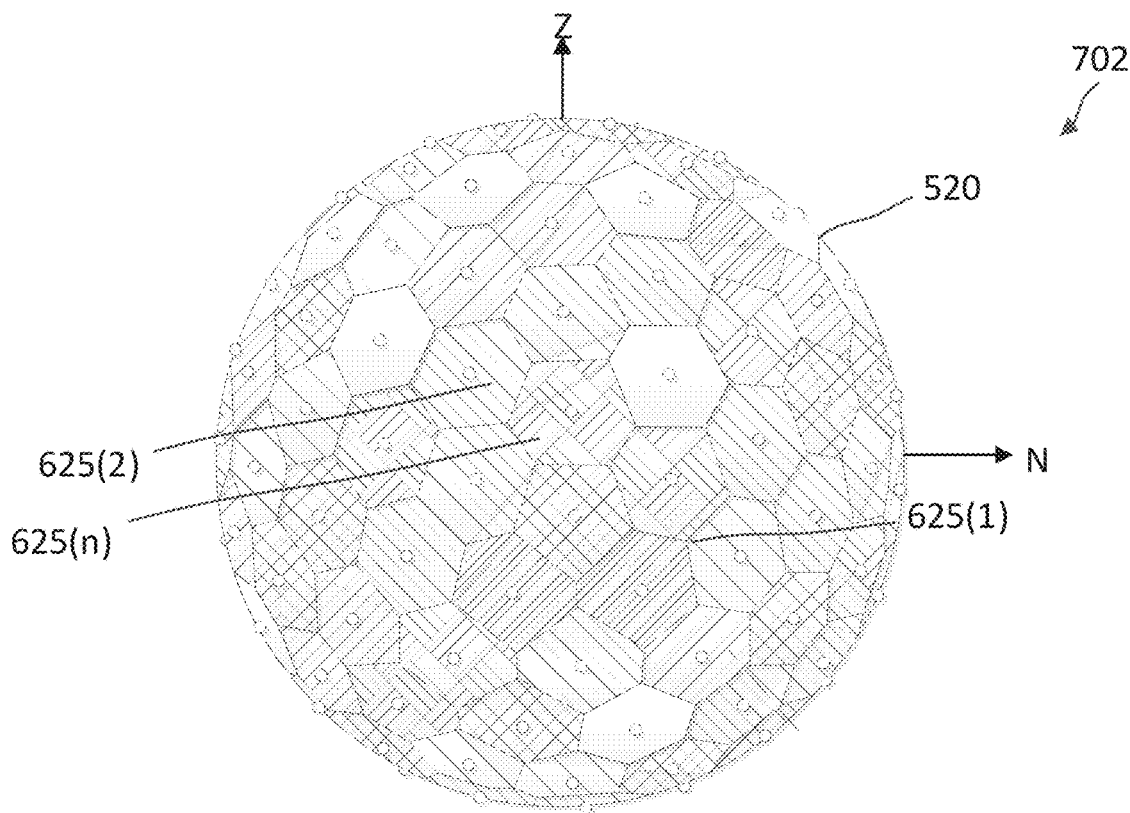

FIG. 7B illustrates a direct far field (DFF) measurement setup 702 of a wireless device according to some aspects of the present disclosure. The measurement setup 702 may be employed by BS s such as the BS s 105, 205 and UEs such as the UEs 115, 215 in a network such as the network 100. The measurement setup 702 may be configured similar to the measurement setup 602 with the difference being the arrangement in the location (e.g., an intended zone and/or an unintended zone) of the RF sensors 522(1) . . . 522(n). In contrast to the arrangement in FIG. 6B, in FIG. 7B the RF sensors 522(1) . . . 522(n) are arranged equidistant to one another. Consequently, the tiles 625(1) . . . 625(n) that represent the regions within which RF sensors 522(1) . . . 525(n) respectively measure the RF parameters may be arranged according to the equidistant spacing of the RF sensors 522(1) . . . 525(n). Tiles 625(1) . . . 625(n) in FIG. 7B may also be shaped as polygons and configured as Voronoi regions.

Figure 8:
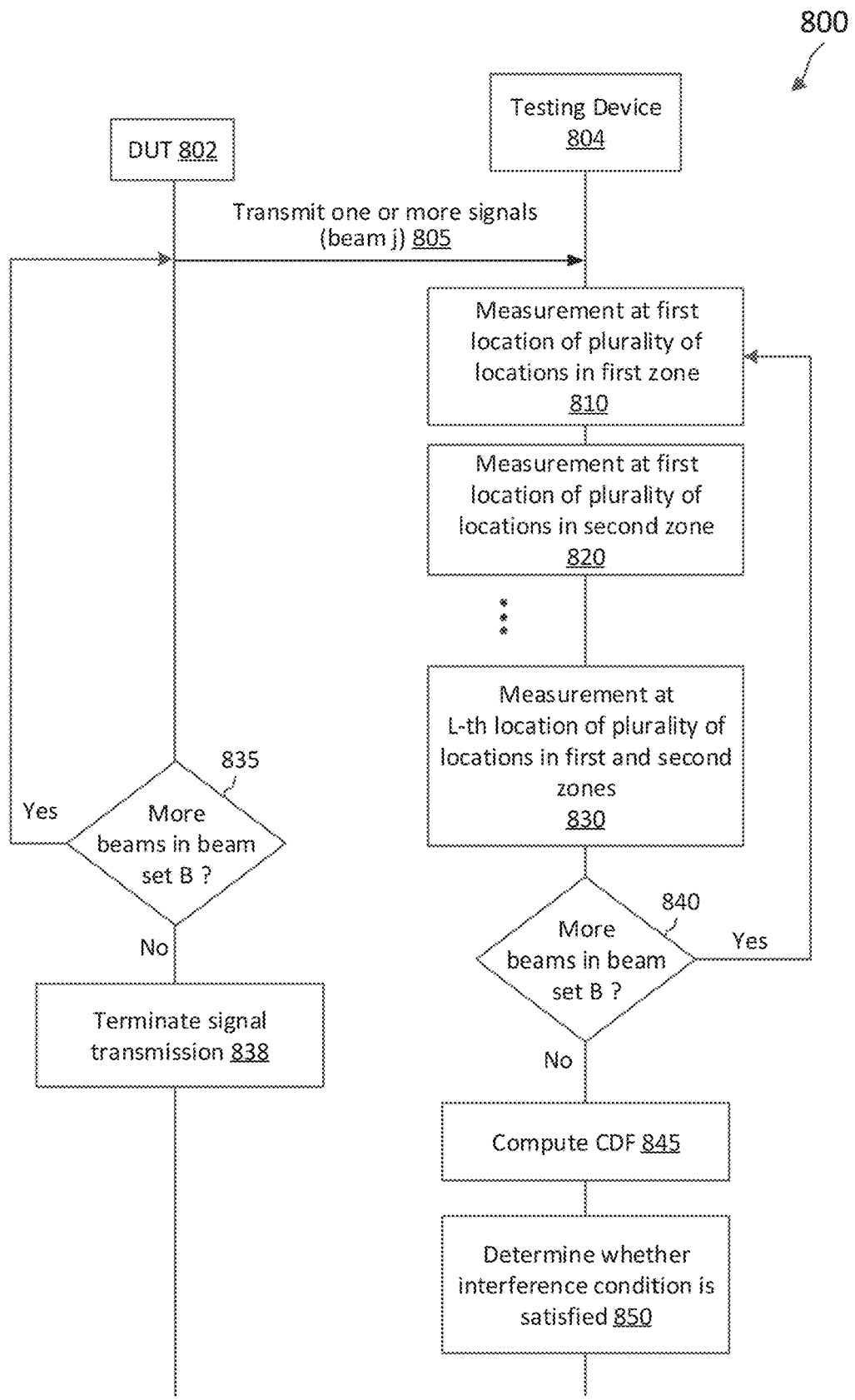
FIG. 8 is a sequence diagram illustrating a narrow beam interference testing method according to some aspects of the present disclosure.

FIG. 8 is a sequence diagram illustrating a narrow beam interference testing method 800 according to some aspects of the present disclosure. The method 800 may be implemented between a testing device 804 and a device under test (DUT) 802. In some aspects, the testing device 804 may be a wireless communication device testing equipment, and the DUT 802 may be a BS similar to the BS 105 and/or 205 or a UE similar to the UEs 115 and/or 215. In other aspects, the testing device 804 may be a BS similar to the BS 105 and/or 205, and the DUT 802 a UE similar to the UEs 115 and/or 215. In some aspects, the method 800 may be implemented in conjunction with the measurement setups 500, 600, 602, 700, and/or 702 discussed above with reference to FIGS. 5, 6A, 6B, 7A, and/or 7B. In some aspects, the testing device 804 may be similar to the BS 1100 of FIG. 11 and may utilize one or more components, such as the processor 1102, the memory 1104, the interference module 1108, the transceiver 1110, the modem 1112, and the one or more antennas 1116 with reference to FIG. 11, to execute the actions of the method 800. In other aspects, the DUT 802 may be similar to the wireless communication device 1200 of FIG. 12 and may utilize one or more components, such as the processor 1202, the memory 1204, the interference module 1208, the transceiver 1210, the modem 1212, and the one or more antennas 1216 with reference to FIG. 12, to execute the actions of the method 800. As illustrated, the method 800 includes a number of enumerated actions, but aspects of the method 800 may include additional action(s) before, after, and in between the enumerated action. In some aspects, one or more of the enumerated actions may be omitted or performed in a different order.

At 805, the DUT 802 transmits, and the testing device 804 receives, one or more signals associated with a beam parameter. The DUT 802 may transmit the one or more signals using a certain transmission beam. The beam parameter may be denoted as j, representing a certain beam characteristic such as a beam direction. That is, the DUT 802 transmits the one or more signals using a transmission beam j. For instance, the DUT 802 may transmit a first signal of the one or more signals using the transmission beam j, transmit a second signal of the one or more signals using the same transmission beam j, and so on. In some instances, the transmission beam j may be similar to the transmission beam 202 discussed above with reference to FIG. 2, the transmission beam with the main lobe and side lobes discussed above with reference to FIG. 4, or the transmission beam 524 discussed above with reference to FIG. 5. The transmission beam j may be from a set of beams, denoted as B, each having a different beam characteristic (e.g., each beam with a different beam direction having a different azimuth angle and/or a different elevation angle). The set of beams B may have N number of beams (e.g., beam 1, beam 2, . . . , beam N). In some aspects, the DUT 802 may generate the set of transmissions beams B based on a beam codebook. The beam codebook may include various beamforming parameters, for instance, including phase parameters and/or gain parameters for configuring antenna panel(s), antenna array(s), and/or antenna elements of the DUT 802 to generate the set of transmissions beams B. The one or more signals may include any suitable beam measurement signals, such as CSI-RSs, SSBs, and/or any predetermined waveform signals that can facilitate receive signal measurements (e.g., EIRPs) at the testing device 804.

In response to receiving the one or more signals from the DUT 802, the testing device 804 may determine, at each location of a plurality of locations, a signal measurement for at least one received signal of the one or more received signals. Each measurement location of the plurality of locations (e.g., an intended zone and/or an unintended zone) may be at a certain elevation angle, represented by $\theta$, and a certain azimuth angle, represented by f, with respect to the DUT 802. In some aspects, the plurality of locations may be associated with a spherical coverage of the DUT 802. In this regard, the DUT 802 may be positioned at a certain location and the plurality of locations may be distributed across a surface of a spherical space (e.g., the sphere 520) enclosing the DUT 802, for instance, similar to the measurement setup 500 discussed above with reference to FIG. 5. The plurality of locations (e.g., an intended zone and/or an unintended zone) may be arranged in a wide variety of arrangements. In some aspects, the plurality of locations may be planar uniform as shown in FIGS. 6A-6B. In other aspects, the plurality of locations may be spherical uniform as shown in FIGS. 7A-7B.

In general, the plurality of locations may be arranged in any suitable manner. For instance, the plurality of locations may be spaced apart from each other by any suitable distances (e.g., uniformly or non-uniformly). That is, the elevation angles and/or the azimuth angles for the plurality of locations can have any suitable granularities or step size. Further, the plurality of locations may cover any suitable angular spatial sector of the DUT 802. That is, the plurality of locations may be defined with azimuth angles and/or elevation angles in any suitable range. For instance, in some aspects, the plurality of locations may be distributed within a certain spatial sector of interest (e.g., an intended zone and/or an unintended zone) to the operations of the DUT 802. As an example, when the DUT 802 is a BS such as the BS 105 or 205, and the BS is to be for deployment in an area covered by three cells, the plurality of locations for the signal measurements may be within −60 degrees to +60 degrees in the azimuth direction based on the field of view of a cell served by the BS. In some aspects, the range and/or granularity of measurements in terms of angular azimuth and elevation directions can be determined based on regulation on the frequency band of operations or any other suitable operating parameter associated with the DUT 802.

In some aspects, the testing device 804 may include RF sensors or transmission-reception points (TRPs) that are positioned at the plurality of locations. Accordingly, the testing device may measure a signal received from the DUT 802 at each of the plurality of locations at the same time. In other aspects, the testing device 804 may be repositioned to a different location of the plurality of locations for each measurement. In such a test setup, the DUT 802 may transmit the same signal repeatedly using the same transmission beam so that the testing device 804 may determine a signal measurement at each location of the plurality of locations.

At 810, the testing device 804 determines and records a signal measurement for at least one of the one or more received signals at a plurality of locations in the intended zone. The signal measurement may be a received signal power or an EIRP of at least one of the one or more received signals. As explained above, each of the plurality of locations in the intended zone may have a certain elevation angle $\theta$ and a certain azimuth angle $\phi$ with respect to the DUT 802. Thus, the signal measurement at the intended zone can be represented by $R\_(\phi)(1),\theta(1))$ or simplified to $R\_1$.

At 820, the testing device 804 determines and records a signal measurement for at least one of the one or more received signals at a plurality of locations in the unintended zone. The signal measurement may be a received signal power or an EIRP of at least one of the one or more received signals. The signal measurement at the unintended zone can be represented by R_(ϕ)(2),θ(2)) or simplified to R_2.

The testing device 804 may continue to determine, at each of the plurality of locations, a signal measurement for at least one of the one or more received signals until one signal measurement is collected at each of the plurality of locations. As an example, a number of the plurality of locations is L. As such, at 830, the testing device 804 determines and records a signal measurement for the one or more received signals at an L-th location of the plurality of locations. The signal measurement may be a received signal power or an EIRP of at least one of the one or more received signals. The signal measurement at the L-th location can be represented by R_(ϕ(L),θ(L)) or simplified to R_L. That is, at the end of action 830, the testing device 804 may have obtained and recorded L signal measurements (one signal measurement at each location of the plurality of locations in the intended and unintended zones). The set of L signal measurements at the plurality of locations for the transmission beam j can be represented by Ej={R_1, R_2, . . . , R_L}.

At 835, the DUT 802 determines whether there are more transmission beams in the beam set B to be measured (for testing). If there are more transmission beams in the beam set B, the DUT 802 may return to aspect 805 and transmit one or more signals using a next transmission beam (e.g., beam j+1) in the beam set B. If all the N transmission beams in the beam set B have been measured, the DUT 802 may terminate all test transmissions as shown by aspect 838.

At 840, the testing device 804 determines whether there are more transmission beams in the beam set B to be tested or measured. If there are more transmission beams in the beam set B, the testing device 804 may repeat the aspects of 810-830 to determine, at each location of a plurality of locations, a signal measurement for at least one of the one or more received signals associated with the next transmission beam (e.g., beam j+1) of the DUT 802. If all the transmission beams in the beam set B have been measured, the testing device 804 proceeds to aspect 845.

At 845, after recording signal measurements at each location of the plurality of locations for each transmission beam in the beam set B, the testing device 804 determines a CDF for the signal measurements for each beam j. The signal measurements for all transmission beams can be represented by E={E1, E2, . . . , EN}, where E1 may represent the set of signal measurements for a first transmission beam (in the beam set B) measured at the plurality of locations, E2 may represent the set of signal measurements for a second transmission beam (in the beam set B) measured at the plurality of locations, and so on.

The CDF of a random variable X can be represented by F(x), where F(x)=Pr (X≤x), which is the probability that X is less than or equal to x. In some aspects, for each transmission j, the testing device 804 may compute a CDF for Ej by calculating a probability distribution function (PDF) for the corresponding set of signal measurements, and then calculate cumulative probabilities from the PDF. Examples of CDF of signal measurements are shown and discussed with reference to FIG. 9.

At 850, the testing device 804 determines whether an interference condition (e.g., a narrow beam condition) is satisfied for each transmission beam j. In some instances, the CDF of the recorded EIRPs may be compared to a reference CDF to determine whether the DUT 802 satisfies an interference condition. The reference CDF may be a CDF of a narrow beam signal that satisfies the interference condition. For instance, the reference CDF may be a CDF from a previously recorded set of EIRPs that satisfies the interference condition. As another example, the reference CDF may be from a test standard (e.g., a 3GPP standard) that defines a CDF that satisfies the interference condition. In some instances, the reference CDF may be part of a set of reference CDFs that satisfies the interference condition. For instance, the set of reference CDFs may include reference CDFs that are matched to particular operating conditions (e.g., frequency of operation, mobility conditions, type of wireless devices, device power class, class of services, interference level tolerance, etc.) and scenarios (e.g., density of wireless devices in the area of the DUT 802).

In some instances, the CDF of the recorded EIRPs in the intended zone may be compared to the CDF of recorded EIRPs in the unintended zone to determine whether the DUT 802 satisfies an interference condition. For instance, determining whether the DUT 802 satisfies an interference condition may include determining whether a k-th percentile of the CDF of the signal measurements within the intended zone satisfies a first threshold or determining whether the k-th percentile of the CDF of the signal measurements within the unintended zone satisfies a second threshold. The first threshold may be based on a size of the intended zone and the second threshold may be based on a size of the unintended zone.

In some aspects, determining whether the wireless communication device satisfies the interference condition may include determining whether an antenna gain of the DUT 802 satisfies the narrow beam condition. Determining whether the antenna gain of the DUT 802 satisfies the narrow beam condition may include determining whether a k-th percentile of the CDF of the signal measurements minus an offset within the intended zone satisfies a first threshold or determining whether the k-th percentile of the CDF of the signal measurements minus an offset within the unintended zone satisfies a second threshold. The offset may include a transmit power of the one or more signals from the DUT 802.

In some aspects, determining whether the DUT 802 satisfies the interference condition may include determining whether a difference between a k-th percentile and a j-th percentile of the CDF of the signal measurements at the plurality of locations within the intended zone satisfies a first threshold and determining whether an i-th percentile of the CDF of the signal measurements minus an offset at the plurality of locations within the intended zone satisfies a second threshold. The value of k may be greater than a value of j.

In some aspects, determining whether the DUT 802 satisfies the interference condition may include determining whether a difference between a k-th percentile and a j-th percentile of the CDF of the signal measurements at the plurality of locations within the unintended zone satisfies a first threshold and determining whether an i-th percentile of the CDF of the signal measurements minus an offset at the plurality of locations within the unintended zone satisfies a second threshold. The value of k may be greater than a value of j.

In some aspects, determining whether the DUT 802 satisfies the interference condition may include determining whether a difference between a k-th percentile and a j-th percentile of the CDF of the signal measurements at the plurality of locations within the intended zone satisfies a first threshold, determining whether an i-th percentile of the CDF of the signal measurements minus an offset at the plurality of locations within the intended zone satisfies a second threshold, determining whether a difference between a y-th percentile signal measurement and a x-th percentile of the CDF of the signal measurements at the plurality of locations within the unintended zone satisfies a first threshold, and determining whether a z-th percentile of the CDF of the signal measurements minus an offset at the plurality of locations within the unintended zone satisfies a second threshold. The value of k may be greater than a value of j. The value of y may be greater than a value of x.

In some aspects, determining whether the DUT 802 satisfies the interference condition may include determining whether a difference between a k-th percentile of the CDF of the signal measurements at the plurality of locations within the intended zone and a j-th percentile of the CDF of the signal measurements at the plurality of locations within the unintended zone satisfies a threshold.

As described above with reference to FIG. 3, a channel access procedure may be based on the comparison of the CDF of the DUT 802 beams in the intended zone and the unintended zone. For instance, if the transmission beam b satisfies the interference condition, the DUT 802 may refrain from performing an LBT and/or long-term sensing before accessing a wireless channel. As another example, if the transmission beam b fails to satisfy the interference condition, the DUT 802 may perform an LBT and/or a long-term sensing before accessing the wireless channel.

Figure 9:
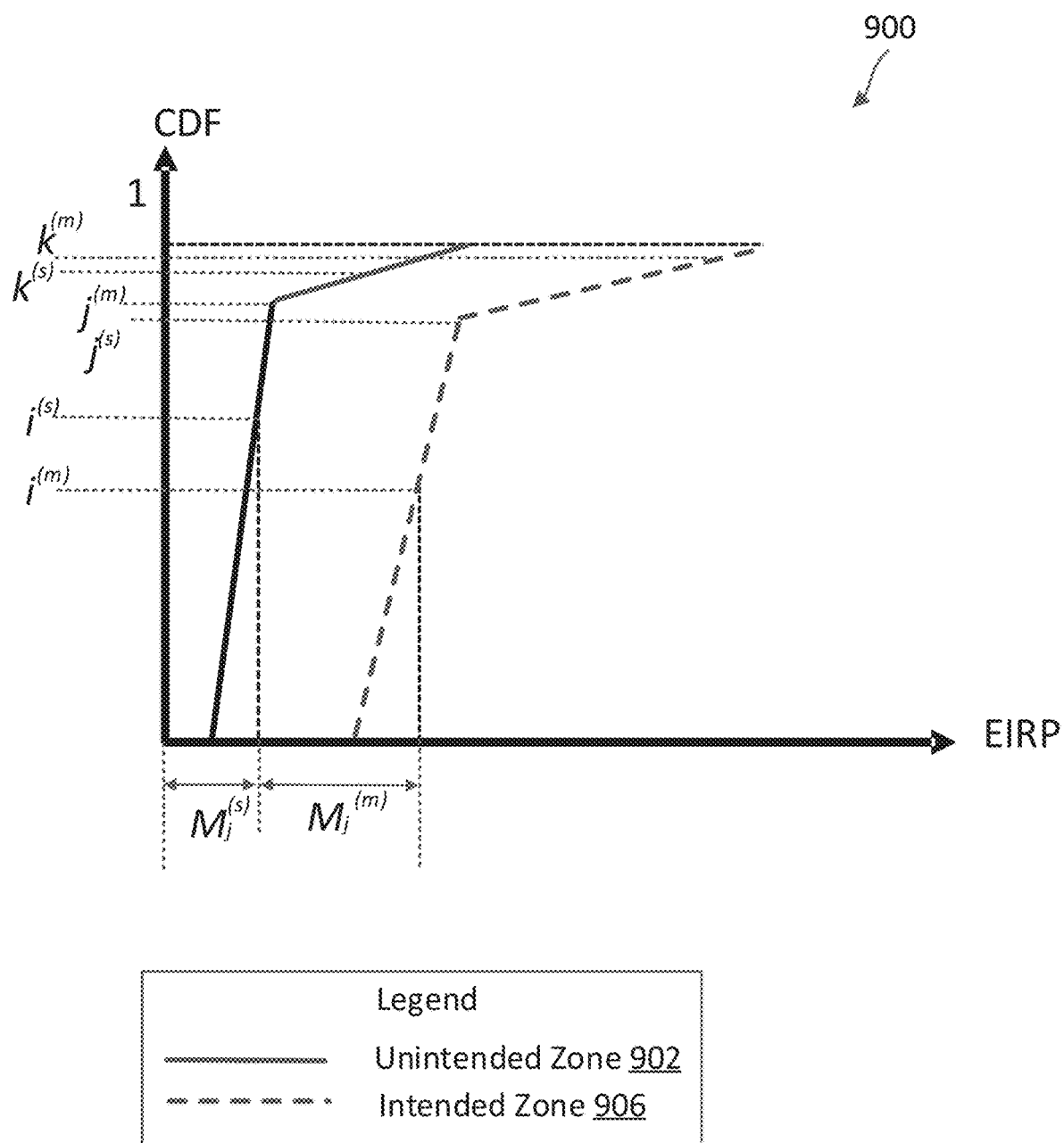
FIG. 9 illustrates a graph of an interference condition determination scheme according to some aspects of the present disclosure.

FIG. 9 illustrates a graph 900 of an interference condition determination scheme according to some aspects of the present disclosure. Graph 900 illustrates a CDF curve of a set of recorded beams (e.g., EIRP measurements) in an unintended zone 902 and a CDF curve of a set of recorded beams in an intended zone 906. The criteria for satisfying the interference condition may include narrowing the transmitted beam within the intended zone and reducing the EIRP of the transmitted beam in the unintended zone. The intended zone may be a zone in which the transmission beam is intended to carry a desired signal to a wireless communication device. The unintended zone may be a zone in which the transmission beam causes an undesired interference to a different wireless communication device.

The set of recorded beams may include transmission beam 524 as described above with reference to FIGS. 5, 6A, 6B, 7A, and 7B. The set of recorded beams may be transmitted by a wireless device. For instance, the set of recorded beams may be transmitted by BSs such as the BSs 105 and/or 205 and/or UEs such as the UEs 115 and/or 215. The set of recorded beams may be measured at points located on a sphere as described above with reference to FIGS. 5, 6A, 6B, 7A, and 7B. A CDF of the set of recorded beams in the unintended zone 902 is plotted next to a CDF curve of the set of recorded beams in the intended zone 906 as shown in FIG. 9.

Referring to graph 900, the horizontal axis may indicate the measured EIRP of the transmission beam and the vertical axis may indicate the cumulative distribution of the measurements in percentile. The criteria for determining whether the transmission beam satisfies the interference condition (e.g., a narrow beam condition) may include determining whether the $K^{(s)}$ percentile of the CDF of the set of recorded beams in the unintended zone 902 satisfies a first threshold and/or whether the $K^{(m)}$ percentile of the CDF of the set of recorded beams in the intended zone 906 satisfies a second threshold. For instance, the criteria for determining whether the transmission beam satisfies the interference condition (e.g., a narrow beam condition) may include determining whether the $K^{(s)}$ percentile of the CDF of the set of recorded beams in the unintended zone 902 is less than a first threshold and/or whether the $K^{(m)}$ percentile of the CDF of the set of recorded beams in the intended zone 906 is less than a second threshold. In some aspects, the $K^{(s)}$ percentile may be different from the $K^{(m)}$ percentile. In some aspects, the first threshold may be the same or different from the second threshold.

Additionally or alternatively, the criteria for determining whether the transmission beam satisfies the interference condition (e.g., a narrow beam condition) may include determining whether the $K^{(s)}$ percentile of the CDF of the set of recorded beams minus an offset in the unintended zone 902 satisfies a first threshold and/or whether the $K^{(m)}$ percentile of the CDF of the set of recorded beams minus the offset in the intended zone 906 satisfies a second threshold. For instance, the criteria for determining whether the transmission beam satisfies the interference condition (e.g., a narrow beam condition) may include determining whether the $K^{(s)}$ percentile of the CDF of the set of recorded beams minus the offset in the unintended zone 902 is less than the first threshold and/or whether the $K^{(m)}$ percentile of the CDF of the set of recorded beams minus the offset in the intended zone 906 is less than the second threshold. In some aspects, the first threshold may be the same or different from the second threshold. The offset may be based upon a transmit power of the device under test (e.g., the UE or BS under test). By subtracting the transmit power of the device under test from the recorded EIRP measurements, the gain of the antenna of the device under test may be tested to determine if it satisfies the interference condition.

Additionally or alternatively, the criteria for determining whether the transmission beam satisfies the interference condition may be based on different CDF percentiles for EIRPs over the intended zone and the unintended zone. For instance, graph 900 may include CDF percentiles $K^{(m)}$, $J^{(m)}$), and $I^{(m)}$ in the intended zone, where $K^{(m)} > J^{(m)}$ and $J^{(m)} > I^{(m)}$ and CDF percentiles $K^{(s)}$, $J^{(s)}$, and $I^{(s)}$ in the unintended zone, where $K^{(s)} > J^{(s)}$ and $J^{(s)} > I^{(s)}$. In some aspects, the criteria for determining whether the transmission beam satisfies the interference condition may include determining whether the $K^{(m)}$ percentile minus the $J^{(m)}$ percentile of the CDF of the set of recorded beams in the intended zone 906 is greater than a first threshold and whether the $I^{(m)}$ percentile of the CDF of the set of recorded beams minus the offset in the intended zone 906 less than a second threshold. In some aspects, the first threshold may be the same or different from the second threshold.

Additionally or alternatively, the criteria for determining whether the transmission beam satisfies the interference condition may include determining whether the $K^{(s)}$ percentile minus the $J^{(s)}$ percentile of the CDF of the set of recorded beams in the unintended zone 902 is greater than a first threshold and whether the $I^{(s)}$ percentile of the CDF of the set of recorded beams minus the offset in the unintended zone 902 less than a second threshold. In some aspects, the first threshold may be the same or different from the second threshold.

Additionally or alternatively, the criteria for determining whether the transmission beam satisfies the interference condition may include determining whether the $K^{(m)}$ percentile minus the $J^{(m)}$ percentile of the CDF of the set of recorded beams in the intended zone 906 is greater than a first threshold and whether the $I^{(m)}$ percentile of the CDF of the set of recorded beams minus the offset in the intended zone 906 less than a second threshold and whether the $K^{(s)}$ percentile minus the $J^{(s)}$ percentile of the CDF of the set of recorded beams in the unintended zone 902 is greater than a third threshold and whether the $I^{(s)}$ percentile of the CDF of the set of recorded beams minus the offset in the unintended zone 902 less than a fourth threshold. The first, second, third, and fourth thresholds may be the same thresholds or different thresholds.

Additionally or alternatively, the criteria for determining whether the transmission beam satisfies the interference condition may include a percentile difference between the intended zone 906 and the unintended zone 902. The criteria for determining whether the transmission beam satisfies the interference condition may include determining whether the $K^{(m)}$ percentile of the CDF of the set of recorded beams in the intended zone 906 minus the $K^{(s)}$ percentile of the CDF of the set of recorded beams in the unintended zone 902 satisfies a threshold. For instance, the criteria for determining whether the transmission beam satisfies the interference condition may include determining whether the $K^{(m)}$ percentile of the CDF of the set of recorded beams in the intended zone 906 minus the $K^{(s)}$ percentile of the CDF of the set of recorded beams in the unintended zone 902 is greater than a threshold.

Figure 10:
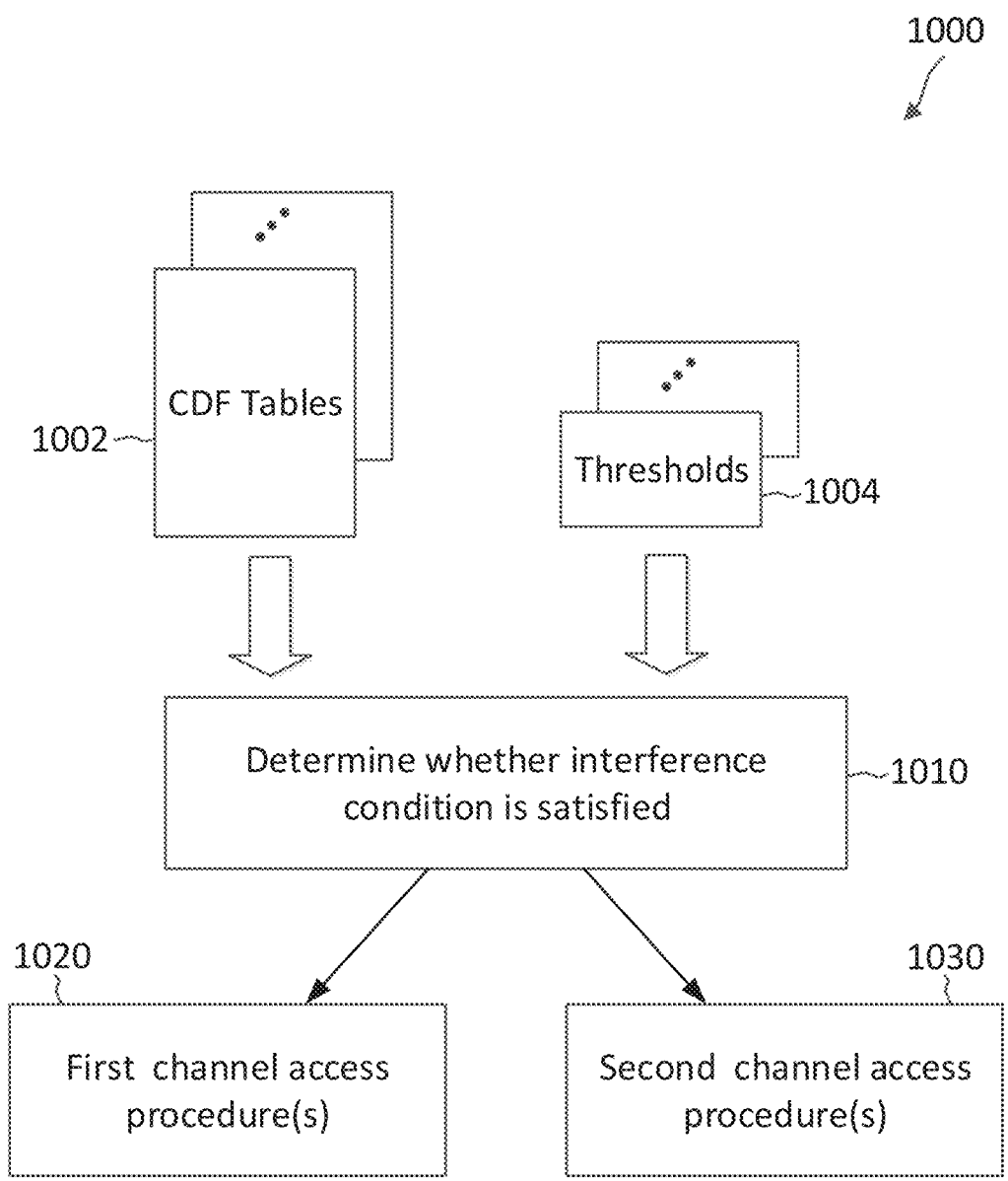
FIG. 10 illustrates a channel access method according to some aspects of the present disclosure.

FIG. 10 illustrates a channel access method 1000 according to some aspects of the present disclosure. The method 1000 may be employed by BSs such as the BSs 105 and/or 205 and/or UEs such as the UEs 115 and/or 215. In particular, a wireless communication device (e.g., a BS or a UE) may determine which channel access procedure(s) to use for channel access in an unlicensed band, for instance, in the mmWave range or sub-THz range, using the method 1000. In some aspects, the wireless communication device may be a BS similar to the BS 105, 205, and/or 1100 and may utilize one or more components, such as the processor 1102, the memory 1104, the interference module 1108, the transceiver 1110, the modem 1112, and the one or more antennas 1116 with reference to FIG. 11, to execute the actions of the method 1000. In other aspects, the wireless communication device may be similar to a UE such as the UEs 115, 215, and/or wireless communication device 1200, and may utilize one or more components, such as the processor 1202, the memory 1204, the interference module 1208, the transceiver 1210, the modem 1212, and the one or more antennas 1216 with reference to FIG. 12, to execute the actions of the method 1000.

In the method 1000, a wireless communication device may utilize similar metric(s) (e.g., a comparing a CDF of transmitted beams in the intended zone and the unintended zone) and interference conditions discussed above in the method 800 with reference to FIG. 8 and the graph of FIG. 9 to select a channel access configuration or procedure during operation (e.g., in real-time).

At 1010, a wireless communication device (e.g., a BS 105, 205, 1100, a UE 115, 215, or wireless communication device 1200) may determine whether an interference condition is satisfied. The interference condition may be related to the narrowness of a transmission beam to be used for transmitting a communication signal. The narrowness of the transmission beam may be defined in terms of its interference to surrounding nodes. In some instances, the transmission beam may be similar to the transmission beam 202 discussed above with reference to FIG. 2, the transmission beam with the main lobe and side lobes discussed above with reference to FIG. 4, the transmission beam 524 discussed above with reference to FIG. 5, or the transmission beam j discussed above with reference to FIG. 8. The determination of whether the interference condition is satisfied may include determining whether a comparison of the CDF of the signal measurements in intended zone with the CDF of the signal measurements in the unintended zone satisfies a threshold. The signal measurements of the transmission beam at the plurality of locations may be obtained using the method 800 discussed above with reference to FIG. 8.

In some aspects, the wireless communication device may have one or more CDF tables 1002 and/or one or more thresholds 1004 stored at a memory (e.g., the memory 1104 and 1204) of the wireless communication device. For instance, a first CDF table 1002 may be a CDF of signal measurements associated with the transmission beam. The first CDF table 1002 may include cumulative probabilities of the signal measurements in the intended zone and in the unintended zone. The wireless communication device may perform a table lookup to obtain the k-th percentile signal measurement from the first CDF table 1002. In some aspects, the wireless communication device may select the threshold from the one or more thresholds 1004 for the comparison used for determining whether the interference condition is satisfied. In some aspects, the wireless communication device may determine the value k for k-th percentile signal measurement to be used for the metric and/or the selected threshold based on operating parameter(s) and/or conditions(s) of the wireless communication device. The operating parameter(s) and/or conditions(s) may include, but are not limited to, a device power class of the wireless communication device, regulations that regulate a frequency band to be used for transmitting the communication signal, and/or interference tolerance level (e.g., a maximum interference tolerance level) of the wireless communication device.

At 1010, if the narrow beam condition is satisfied, the wireless communication device may utilize a first set of channel access procedures at 1020. In some aspects, the first set of channel access procedures may include a channel access without performing an LBT and/or long-term sensing. In some aspects, the first set of channel access procedures at 1020 may also include various restrictions on the transmission power, the transmission duty cycle, and/or the beam dwell time that the wireless communication device may use.

If, however, the narrow beam condition is not satisfied, the wireless communication device may proceed to 1030. At 1030, the wireless communication device may utilize a second set of channel access procedures. In some aspects, the second set of channel access procedures may include a channel access after a successful LBT and/or a low interference detection from long-term sensing. In some aspects, the second set of channel access procedures may also include various restrictions on the transmission power, the transmission duty cycle, and/or the beam dwell time that the wireless communication device may use.

Figure 11:
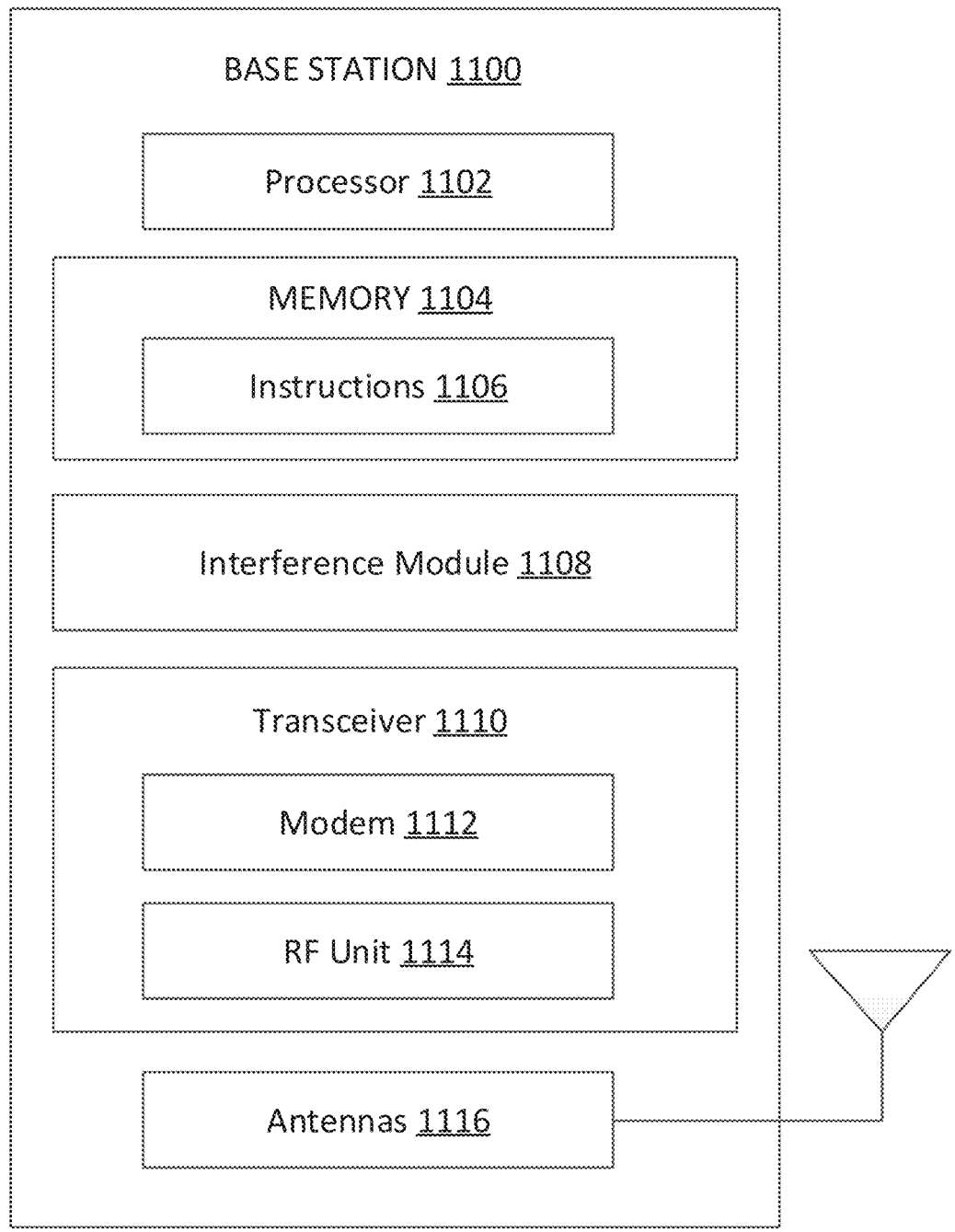
FIG. 11 illustrates a block diagram of a base station (BS) according to some aspects of the present disclosure.

FIG. 11 is a diagram of an exemplary BS 1100 according to some aspects of the present disclosure. The BS 1100 may be a BS 105 as discussed in FIGS. 1-5. As shown, the BS 1100 may include a processor 1102, a memory 1104, an interference module 1108, a transceiver 1110 including a modem subsystem 1112 and a RF unit 1114, and one or more antennas 1116. These elements may be coupled with one another. The term "coupled" may refer to directly or indirectly coupled or connected to one or more intervening elements. For instance, these elements may be in direct or indirect communication with each other, for instance via one or more buses.

The processor 1102 may have various features as a specific-type processor. For instance, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for instance, aspects of FIGS. 1-10 and 13-14. Instructions 1106 may also be referred to as program code. The program code may be for causing a wireless communication device to perform these operations, for instance by causing one or more processors (such as processor 1102) to control or command the wireless communication device to do so. The terms "instructions" and "code" should be interpreted broadly to include any type of computer-readable statement(s). For instance, the terms "instructions" and "code" may refer to one or more programs, routines, subroutines, functions, procedures, etc. "Instructions" and "code" may include a single computer-readable statement or many computer-readable statements.

The interference module 1108 may be implemented via hardware, software, or combinations thereof. For instance, the interference module 1108 may be implemented as a processor, circuit, and/or instructions 1106 stored in the memory 1104 and executed by the processor 1102. In some examples, the interference module 1108 can be integrated within the modem subsystem 1112. For instance, the interference module 1108 can be implemented by a combination of software components (e.g., executed by a DSP or a general processor) and hardware components (e.g., logic gates and circuitry) within the modem subsystem 1112. The interference module 1108 may communicate with one or more components of BS 1100 to implement various aspects of the present disclosure, for instance, aspects of FIGS. 1-10 and 13-14.

In some aspects, the interference module 1108 is configured to determine whether a wireless communication device satisfies an interference condition based on a cumulative distribution of signal measurements at a plurality of locations in an intended zone and an unintended zone. For instance, transceiver 1110 may process multiple beams from a wireless device (e.g., UE 115, 215). The beams may be processed by processor 1102 as described above with reference to FIG. 8. The beams may be received by antennas 1116. The antennas 1116 may be arranged in a spherical pattern as described above with reference to FIGS. 5, 6A, 6B, 7A, and 7B. In some instances, processor 1102 may compute a CDF of the received beams. Processor 1102 may compare the CDF of the received beams to a reference beam as described above with reference to FIG. 9. If processor 1102 determines that the received beams satisfy or do not satisfy an interference condition (e.g., a narrow beam condition), BS 1100 may transmit a control message to the wireless device that transmitted the beams indicating the beams satisfy or do not satisfy the interference condition.

In some aspects, the interference module 1108 is configured to determine whether a DUT (e.g., a DUT 802, a UE 115, 215, a wireless communication device 1200, a BS 105, 205) satisfies an interference condition (e.g., a narrow beam condition), for instance, in a conformance test or manufacturing test. For instance, the transceiver 1110 is configured to receive, from the DUT via the antennas 1116, one or more signals associated with a beam parameter (e.g., a beam direction of a transmission beam of the DUT). The one or more signals may be received from a plurality of locations, each at a respective azimuth angle and a respective elevation angle with respect to the DUT. In some aspects, the antennas 1116 may be arranged in a spherical pattern as described above with reference to FIGS. 5-7. In some aspects, the antennas 1116 may be arranged in any spatial configuration that supports determining whether a DUT satisfies an interference condition The processor 1102 is configured to compute one signal measurement (e.g., EIRPs) at each location of the plurality of locations, compute a CDF of the received signal measurements, and compare the CDF of the received signal measurements in the intended zone to the CDF of the received signal measurements in the unintended zone. In some aspects, the processor 1102 is configured to determine the difference between the CDF of the received signal measurements in the intended zone and the CDF of the received signal measurements in the unintended zone at multiple percentiles (e.g., k-th percentile, j-th percentile, etc.). The processor 1102 may be configured to compare the differences at each of the multiple percentiles to a threshold to determine if the DUT satisfies the interference condition. Each comparison may use the same threshold or a different threshold for each percentile.

In some aspects, the interference module 1108 is configured to select a channel access configuration (e.g., channel access parameters or procedures) for transmitting a communication signal in an unlicensed frequency band using a transmission beam during operation (in real-time). The transceiver 1110 is configured to transmit, based on the channel access configuration and using the transmission beam, the communication signal in the unlicensed frequency band. For instance, if the interference condition is satisfied, the transceiver 1110 may transmit the communication signal using the transmission beam without performing channel sensing (e.g., an LBT or long-term sensing). If, however, the interference condition is not satisfied, the transceiver 1110 may perform an LBT and/or long-term sensing prior to transmitting the communication signal using the transmission beam.

In some aspects, one or more tables of CDF of signal measurements stored at the memory 1104, and the interference module 1108 is configured to obtain the k-th percentile signal measurement by performing a table lookup from the stored CDF tables.

As shown, the transceiver 1110 may include the modem subsystem 1112 and the RF unit 1114. The transceiver 1110 can be configured to communicate bi-directionally with other devices, such as the UEs 115 and/or BS 1100 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., narrow transmission beams, interference test beams, RRC configurations, MIB, SIB, PDSCH data and/or PDCCH DCIs, etc.) from the modem subsystem 1112 (on outbound transmissions) or of transmissions originating from another source such as a UE 115, 215, and/or UE 1500. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 1100 to enable the BS 1100 to communicate with other devices.

The RF unit 1114 may provide the modulated and/or processed data, e.g., data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., narrow transmission beams, interference test beams, PUSCH data, PUCCH UCI, MSG1, MSG3, etc.) to the interference module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
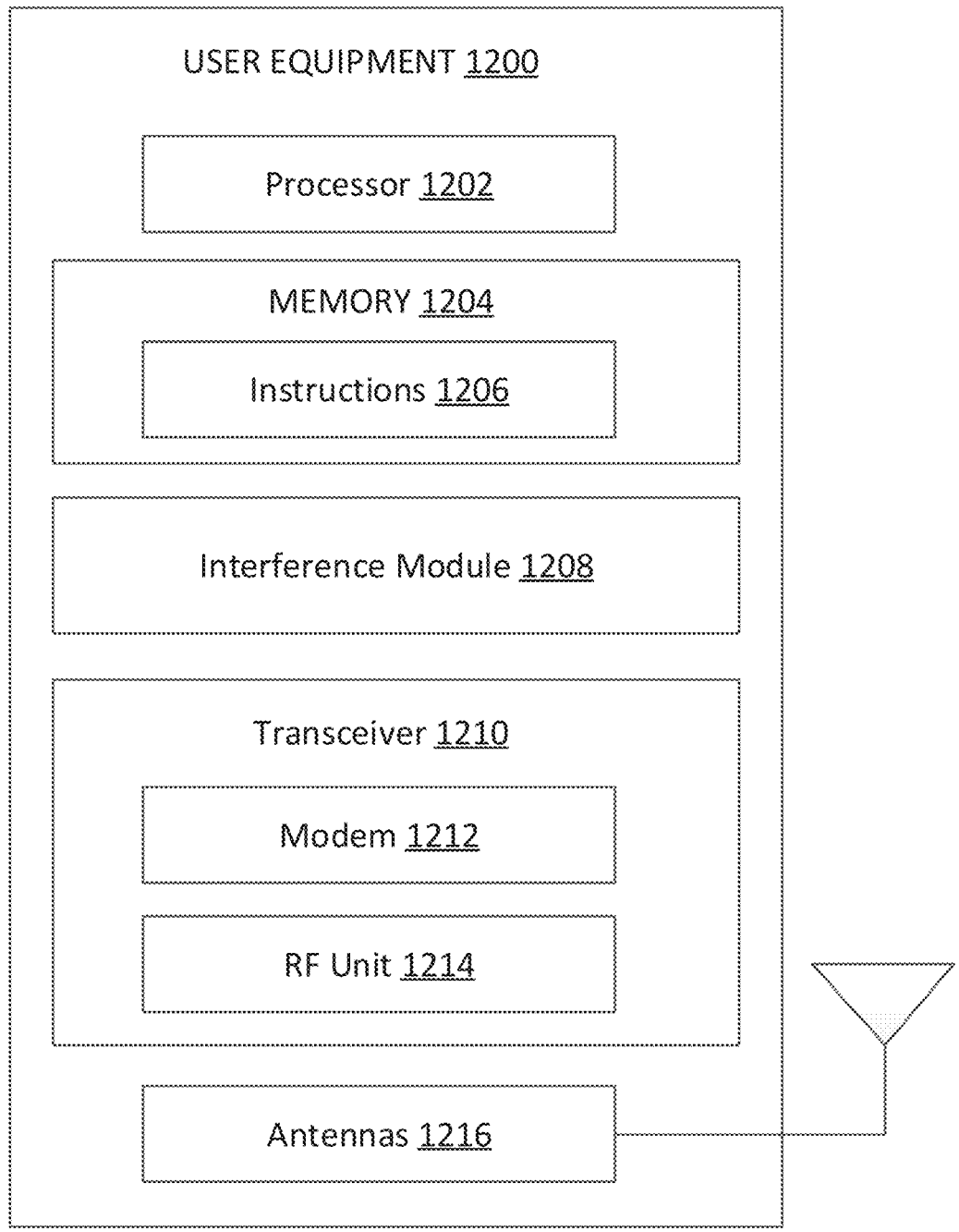
FIG. 12 illustrates a block diagram of a user equipment (UE) according to some aspects of the present disclosure.

FIG. 12 is a block diagram of an exemplary wireless communication device 1200 according to some aspects of the present disclosure. The wireless communication device 1200 may be a UE 115 as discussed above in FIGS. 1-5. As shown, the wireless communication device 1200 may include a processor 1202, a memory 1204, an interference module 1208, a transceiver 1210 including a modem subsystem 1212 and a radio frequency (RF) unit 1214, and one or more antennas 1216. These elements may be coupled with one another. The term "coupled" may refer to directly or indirectly coupled or connected to one or more intervening elements. For instance, these elements may be in direct or indirect communication with each other, for instance via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to a UE 115 or in connection with aspects of the present disclosure, for instance, aspects of FIGS. 1-10 and 13-14.

The interference module 1208 may be implemented via hardware, software, or combinations thereof. For instance, the interference module 1208 may be implemented as a processor, circuit, and/or instructions 1206 stored in the memory 1204 and executed by the processor 1202. In some aspects, the interference module 1208 can be integrated within the modem subsystem 1212. For instance, the interference module 1208 can be implemented by a combination of software components (e.g., executed by a DSP or a general processor) and hardware components (e.g., logic gates and circuitry) within the modem subsystem 1212. The interference module 1208 may communicate with one or more components of wireless communication device 1200 to implement various aspects of the present disclosure, for instance, aspects of FIGS. 1-10 and 13-14.

In some aspects, the interference module 1208 is configured to determine whether a wireless communication device 1200 satisfies an interference condition based on a cumulative distribution of signal measurements at a plurality of locations and a reference probability distribution. For instance, transceiver 1210 may transmit multiple beams. The beams may be transmitted by antennas 1216. The beams may be transmitted to RF sensors that are arranged in a spherical pattern as described above with reference to FIGS. 5, 6A, 6B, 7A, and 7B. A processor connected to the RF sensors may determine that the received beams satisfy or do not satisfy an interference condition (e.g., a narrow beam condition). The wireless communication device 1200 may receive a control message that indicates whether the beams satisfy or do not satisfy the interference condition. The wireless communication device 1200 may access a channel based on whether the beams satisfy or do not satisfy the interference condition. For instance, if the beams satisfy the interference condition the wireless communication device 1200 may refrain from performing an LBT and/or an LT when accessing the channel.

In some aspects, the interference module 1208 is configured to determine whether a DUT (e.g., a DUT 802, a UE 115, 215, a wireless communication device 1200, a BS 105, 205) satisfies an interference condition (e.g., a narrow beam condition), for instance, in a conformance test or manufacturing test. For instance, the transceiver 1210 is configured to receive, from the DUT via the antennas 1216, one or more signals associated with a beam parameter (e.g., a beam direction of a transmission beam of the DUT). The one or more signals may be received from a plurality of locations, each at a respective azimuth angle and a respective elevation angle with respect to the DUT. In some aspects, the antennas 1216 may be arranged in a spherical pattern as described above with reference to FIGS. 5-7. In some aspects, the antennas 1216 may be arranged in any spatial configuration that supports determining whether a DUT satisfies an interference condition The processor 1202 is configured to compute one signal measurement (e.g., EIRPs) at each location of the plurality of locations, compute a CDF of the received signal measurements, and compare the CDF of the received signal measurements in the intended zone to the CDF of the received signal measurements in the unintended zone. In some aspects, the processor 1202 is configured to determine the difference between the CDF of the received signal measurements in the intended zone and the CDF of the received signal measurements in the unintended zone at multiple percentiles (e.g., k-th percentile, j-th percentile, etc.). The processor 1202 may be configured to compare the differences at each of the multiple percentiles to a threshold to determine if the DUT satisfies the interference condition. Each comparison may use the same threshold or a different threshold for each percentile.

In some aspects, one or more tables of CDF of signal measurements stored at the memory 1204, and the interference module 1208 is configured to obtain the k-th percentile signal measurement by performing a table lookup from the stored CDF tables.

As shown, the transceiver 1210 may include the modem subsystem 1212 and the RF unit 1214. The transceiver 1210 can be configured to communicate bi-directionally with other devices, such as the BSs 105 and 1400. The modem subsystem 1212 may be configured to modulate and/or encode the data from the memory 1204 and/or the interference module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., narrow beam transmissions, PUSCH data, PUCCH UCI, MSG1, MSG3, etc.) or of transmissions originating from another source such as a UE 115, a BS 105, or an anchor. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the wireless communication device 1200 to enable the wireless communication device 1200 to communicate with other devices.

The RF unit 1214 may provide the modulated and/or processed data, e.g., data packets (or, more generally, data messages that may contain one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., channel access procedures, RRC configurations, MIB, SIB, PDSCH data and/or PDCCH DCIs, etc.) to the interference module 1208 for processing. The antennas 1216 may include multiple antennas of similar or different designs in order to sustain multiple transmission links.

In an aspect, the wireless communication device 1200 can include multiple transceivers 1210 implementing different RATs (e.g., NR and LTE). In an aspect, the wireless communication device 1200 can include a single transceiver 1210 implementing multiple RATs (e.g., NR and LTE). In an aspect, the transceiver 1210 can include various components, where different combinations of components can implement different RATs.

Figure 13:
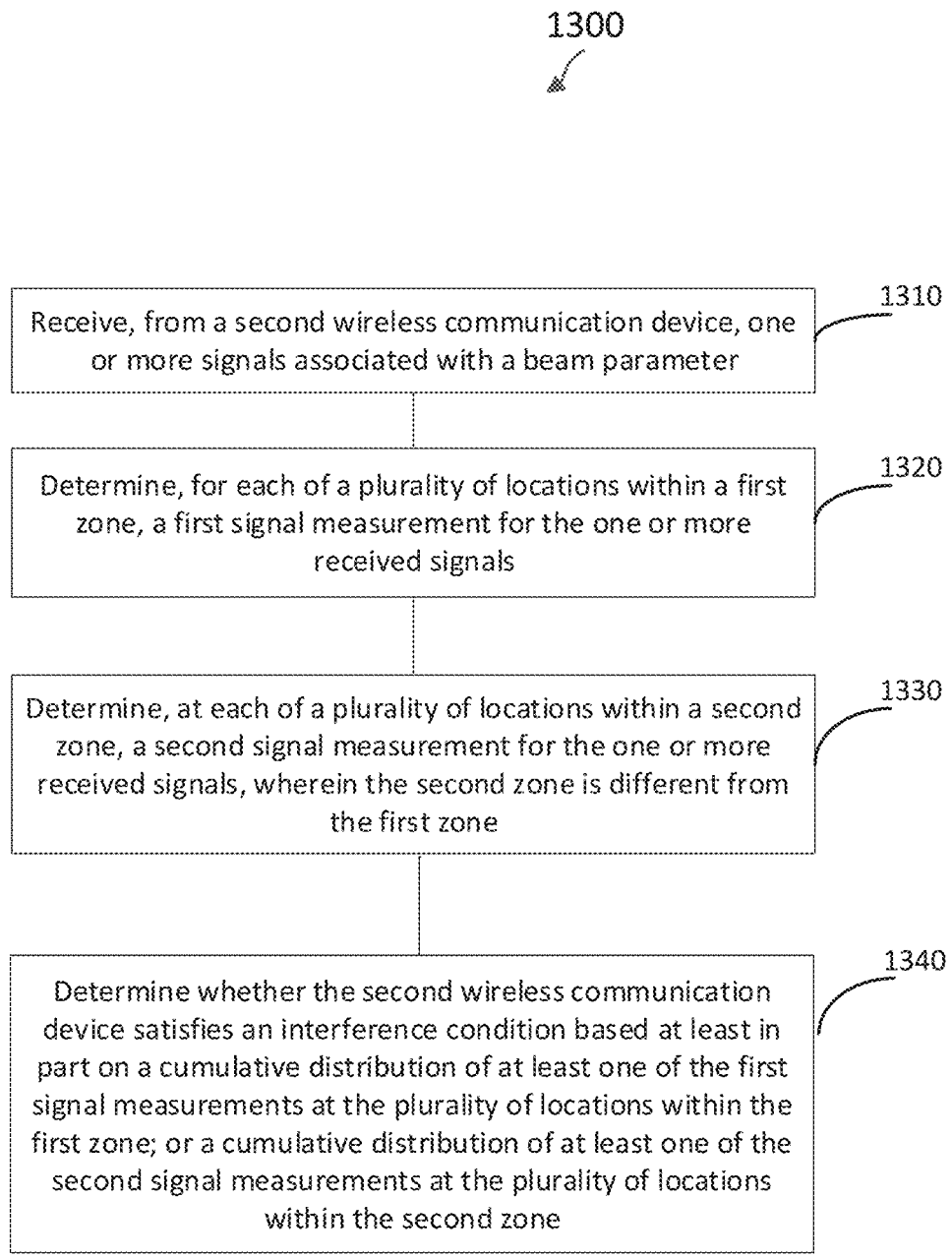
FIG. 13 is a flow diagram of a wireless communication method according to some aspects of the present disclosure.

FIG. 13 is a flow diagram illustrating a wireless communication method 1300 according to some aspects of the present disclosure. Aspects of the method 1300 can be executed by a computing device (e.g., a processor, processing circuit, and/or other suitable component) of a wireless communication device or other suitable means for performing the aspects. In one aspect, a wireless communication device, such as a UE 115, 215, or wireless communication device 1200, may utilize one or more components, such as the processor 1202, the memory 1204, the interference module 1208, the transceiver 1210, the modem 1212, the RF unit 1214, and the one or more antennas 1216, to execute the aspects of method 1300. In another aspect, a wireless communication device, such as a BS 105, 205, or 1100, may utilize one or more components, such as the processor 1102, the memory 1104, the interference module 1108, the transceiver 1110, the modem 1112, the RF unit 1114, and the one or more antennas 1116, to execute the aspects of method 1300. The method 1300 may employ similar mechanisms as described in FIGS. 1-10 and 14. As illustrated, the method 1300 includes a number of enumerated aspects, but aspects of the method 1300 may include additional aspects before, after, and in between the enumerated aspects. In some aspects, one or more of the enumerated aspects may be omitted or performed in a different order.

At 1310, a wireless communication device (e.g., a BS 105, 205, or 1100, or a UE 115, 215, or wireless communication device 1200) receives from a second wireless communication device (e.g., a BS 105, 205, or 1100, or a UE 115, 215, or wireless communication device 1200), one or more signals associated with a beam parameter. In some aspects, means for performing the functionality of 1310 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

The wireless communication device may transmit one or more signals associated with a beam parameter. The wireless communication device may transmit the one or more signals using a certain transmission beam. The beam parameter may be denoted as j, representing a certain beam characteristic such as a beam direction. That is, the wireless communication device transmits the one or more signals using a transmission beam j. For instance, the wireless communication device may transmit a first signal of the one or more signals using the transmission beam j, transmit a second signal of the one or more signals using the same transmission beam j, and so on. In some instances, the transmission beam j may be similar to the transmission beam 202 discussed above with reference to FIG. 2, the transmission beam with the main lobe and side lobes discussed above with reference to FIG. 4, or the transmission beam 524 discussed above with reference to FIG. 5. The transmission beam j may be from a set of beams, denoted as B, each having a different beam characteristic (e.g., each beam with a different beam direction having a different azimuth angle and/or a different elevation angle). The set of beams B may have N number of beams (e.g., beam 1, beam 2, . . . , beam N). In some aspects, the wireless communication device may generate the set of transmissions beams B based on a beam codebook. The beam codebook may include various beamforming parameters, for instance, including phase parameters and/or gain parameters for configuring antenna panel(s), antenna array(s), and/or antenna elements of the wireless communication device to generate the set of transmissions beams B. The one or more signals may include any suitable beam measurement signals, such as CSI-RSs, SSBs, and/or any predetermined waveform signals that can facilitate receive signal measurements (e.g., EIRPs) at the testing device 804.

In response to receiving the one or more signals from the wireless communication device, the testing device may determine, at each location of a plurality of locations, a signal measurement for at least one received signal of the one or more received signals. Each measurement location of the plurality of locations (e.g., an intended zone and/or an unintended zone) may be at a certain elevation angle, represented by 0, and a certain azimuth angle, represented by f, with respect to the wireless communication device. In some aspects, the plurality of locations may be associated with a spherical coverage of the wireless communication device. In this regard, the wireless communication device may be positioned at a certain location and the plurality of locations may be distributed across a surface of a spherical space (e.g., the sphere 520) enclosing the wireless communication device, for instance, similar to the measurement setup 500 discussed above with reference to FIG. 5. The plurality of locations (e.g., an intended zone and/or an unintended zone) may be arranged in a wide variety of arrangements. In some aspects, the plurality of locations may be planar uniform as shown in FIGS. 6A-6B. In other aspects, the plurality of locations may be spherical uniform as shown in FIGS. 7A-7B.

In general, the plurality of locations may be arranged in any suitable manner. For instance, the plurality of locations may be spaced apart from each other by any suitable distances (e.g., uniformly or non-uniformly). That is, the elevation angles and/or the azimuth angles for the plurality of locations can have any suitable granularities or step size. Further, the plurality of locations may cover any suitable angular spatial sector of the wireless communication device. That is, the plurality of locations may be defined with azimuth angles and/or elevation angles in any suitable range. For instance, in some aspects, the plurality of locations may be distributed within a certain spatial sector of interest (e.g., an intended zone and/or an unintended zone) to the operations of the wireless communication device. As an example, when the wireless communication device is a BS such as the BS 105 or 205, and the BS is to be for deployment in an area covered by three cells, the plurality of locations for the signal measurements may be within −60 degrees to +60 degrees in the azimuth direction based on the field of view of a cell served by the BS. In some aspects, the range and/or granularity of measurements in terms of angular azimuth and elevation directions can be determined based on regulation on the frequency band of operations or any other suitable operating parameter associated with the wireless communication device.

In some aspects, the testing device may include RF sensors or transmission-reception points (TRPs) that are positioned at the plurality of locations. Accordingly, the testing device may measure a signal received from the wireless communication device at each of the plurality of locations at the same time. In other aspects, the testing device may be repositioned to a different location of the plurality of locations for each measurement. In such a test setup, the wireless communication device may transmit the same signal repeatedly using the same transmission beam so that the testing device may determine a signal measurement at each location of the plurality of locations.

At 1320, a wireless communication device (e.g., a BS 105, 205, or 1100, or a UE 115, 215, or wireless communication device 1200) determines, for each of a plurality of locations within a first zone, a first signal measurement for the one or more received signals. In some aspects, means for performing the functionality of 1320 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

The wireless communication device determines and records a signal measurement for at least one of the one or more received signals at a plurality of locations in the intended zone. The signal measurement may be a received signal power or an EIRP of at least one of the one or more received signals. As explained above, each of the plurality of locations in the intended zone may have a certain elevation angle $\theta$ and a certain azimuth angle $\phi$ with respect to the DUT. Thus, the signal measurement at the intended zone can be represented by $R\_(\phi)(1),\theta(1))$ or simplified to $R\_1$.

The wireless communication device determines and records a signal measurement for at least one of the one or more received signals at a plurality of locations in the unintended zone. The signal measurement may be a received signal power or an EIRP of at least one of the one or more received signals. The signal measurement at the unintended zone can be represented by $R\_(\phi)(2),\theta(2))$ or simplified to $R\_2$.

The wireless communication device may continue to determine, at each of the plurality of locations, a signal measurement for at least one of the one or more received signals until one signal measurement is collected at each of the plurality of locations. As an example, a number of the plurality of locations is L. As such, the wireless communication device determines and records a signal measurement for the one or more received signals at an L-th location of the plurality of locations. The signal measurement may be a received signal power or an EIRP of at least one of the one or more received signals. The signal measurement at the L-th location can be represented by $R\_(\phi(L),\theta(L))$ or simplified to $R\_L$. That is, the wireless communication device may have obtained and recorded L signal measurements (one signal measurement at each location of the plurality of locations in the intended and unintended zones). The set of L signal measurements at the plurality of locations for the transmission beam j can be represented by $Ej=\{R\_1, R\_2, \ldots, R\_L\}$.

At 1330, a wireless communication device (e.g., a BS 105, 205, or 1100, or a UE 115, 215, or wireless communication device 1200) determines, for each of a plurality of locations within a second zone, a second signal measurement for the one or more received signals. The second zone may be different from the first zone. In some aspects, means for performing the functionality of 1330 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

The wireless communication device may determine, at each of the plurality of locations in the second zone, a signal measurement for at least one of the one or more received signals until one signal measurement is collected at each of the plurality of locations. As an example, a number of the plurality of locations is L. As such, the wireless communication device determines and records a signal measurement for the one or more received signals at an L-th location of the plurality of locations. The signal measurement may be a received signal power or an EIRP of at least one of the one or more received signals. The signal measurement at the L-th location can be represented by $R\_(\phi(L),\theta(L))$ or simplified to $R\_L$. That is, the wireless communication device may have obtained and recorded L signal measurements (one signal measurement at each location of the plurality of locations in the first zone (e.g. the intended zone) and the second zone (e.g., the unintended zone). The set of L signal measurements at the plurality of locations for the transmission beam j can be represented by $Ej=\{R\_1, R\_2, \ldots, R\_L\}$.

At 1340, a wireless communication device (e.g., a BS 105, 205, or 1100, or a UE 115, 215, or wireless communication device 1200) determines whether the second wireless communication device satisfies an interference condition based at least in part on a cumulative distribution of at least one of the first signal measurements at the plurality of locations within the first zone or a cumulative distribution of at least one of the second signal measurements at the plurality of locations within the second zone. In some aspects, means for performing the functionality of 1340 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

Determining whether the transmission beam of the wireless device satisfies an interference condition may be achieved using any suitable technique. For instance, determining whether the wireless communication device satisfies the interference condition may include determining whether a difference between a k-th percentile signal measurement of the signal measurements and a k-th percentile of the reference probability distribution satisfies a threshold. The reference probability distribution may satisfy a narrow beam condition and therefore satisfy the interference condition. In some instances, additional comparisons may be performed to determine whether the wireless communication device satisfies the interference condition. For instance, determining whether a difference between the k-th percentile signal measurement of the signal and a k-th percentile of the reference probability distribution is less than a first threshold and/or determining whether a difference between a j-th percentile signal measurement of the signal measurements and a j-th percentile of the reference probability distribution is less than a second threshold. In this case, the value of k may be greater than a value of j.

In some aspects, determining whether the wireless communication device satisfies the interference condition may include determining whether a k-th percentile signal measurement of the signal measurements within the intended zone (e.g., a first zone) satisfies a first threshold and/or determining whether the k-th percentile signal measurement of the signal measurements within the unintended zone (e.g., a second zone) satisfies a second threshold. The first threshold may be based on a size of the intended zone and the second threshold may be based on a size of the unintended zone.

In some aspects, determining whether the wireless communication device satisfies the interference condition may include determining whether an antenna gain satisfies the narrow beam condition. Determining whether an antenna gain satisfies the narrow beam condition may include determining whether a k-th percentile signal measurement of the signal measurements minus an offset within the intended zone (e.g., a first zone) satisfies a first threshold and/or determining whether the k-th percentile signal measurement of the signal measurements minus an offset within the unintended zone (e.g., a second zone) satisfies a second threshold. The offset may include a transmit power of the one or more signals.

In some aspects, determining whether the wireless communication device satisfies the interference condition may include determining whether a difference between a k-th percentile signal measurement and a j-th percentile of the signal measurements at the plurality of locations within the intended zone satisfies a first threshold and/or determining whether an i-th percentile signal measurement of the signal measurements minus an offset at the plurality of locations within the intended zone satisfies a second threshold. The value of k may be greater than a value of j.

In some aspects, determining whether the wireless communication device satisfies the interference condition may include determining whether a difference between a k-th percentile signal measurement and a j-th percentile of the signal measurements at the plurality of locations within the unintended zone satisfies a first threshold and/or determining whether an i-th percentile signal measurement of the signal measurements minus an offset at the plurality of locations within the unintended zone satisfies a second threshold. The value of k may be greater than a value of j.

In some aspects, determining whether the wireless communication device satisfies the interference condition may include determining whether a difference between a k-th percentile signal measurement and a j-th percentile of the signal measurements at the plurality of locations within the intended zone satisfies a first threshold, determining whether an i-th percentile signal measurement of the signal measurements minus an offset at the plurality of locations within the intended zone satisfies a second threshold, determining whether a difference between a y-th percentile signal measurement and a x-th percentile of the signal measurements at the plurality of locations within the unintended zone satisfies a first threshold, and/or determining whether a z-th percentile signal measurement of the signal measurements minus an offset at the plurality of locations within the unintended zone satisfies a second threshold. The value of k may be greater than a value of j. The value of y may be greater than a value of x.

In some aspects, determining whether the wireless communication device satisfies the interference condition may include determining whether a difference between a k-th percentile signal measurement of the signal measurements at the plurality of locations within the intended zone and a j-th percentile signal measurement of the signal measurements at the plurality of locations within the unintended zone satisfies a threshold.

Figure 14:
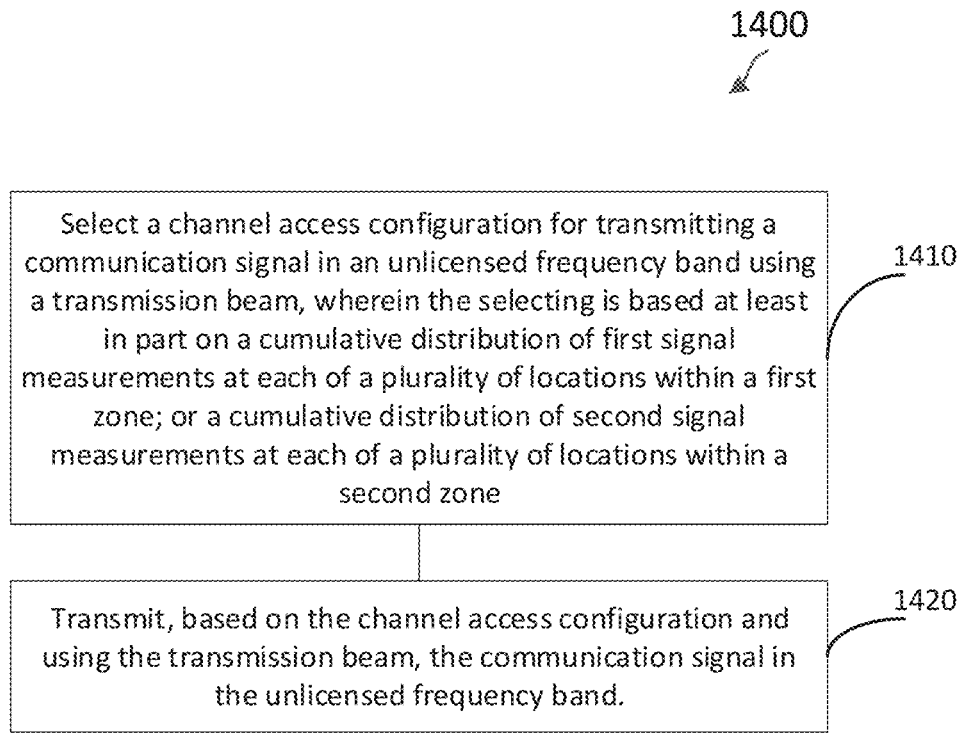
FIG. 14 is a flow diagram of a wireless communication method according to some aspects of the present disclosure.

FIG. 14 is a flow diagram illustrating a wireless communication method 1400 according to some aspects of the present disclosure. Aspects of the method 1400 can be executed by a computing device (e.g., a processor, processing circuit, and/or other suitable component) of a wireless communication device or other suitable means for performing the aspects. In one aspect, a wireless communication device, such as a UE 115, 215, or wireless communication device 1200, may utilize one or more components, such as the processor 1202, the memory 1204, the interference module 1208, the transceiver 1210, the modem 1212, the RF unit 1214, and the one or more antennas 1216, to execute the aspects of method 1400. In another aspect, a wireless communication device, such as a BS 105, 205, or 1100, may utilize one or more components, such as the processor 1102, the memory 1104, the interference module 1108, the transceiver 1110, the modem 1112, the RF unit 1114, and the one or more antennas 1116, to execute the aspects of method 1400. The method 1400 may employ similar mechanisms as described in FIGS. 1-10 and 13. As illustrated, the method 1400 includes a number of enumerated aspects, but aspects of the method 1400 may include additional aspects before, after, and in between the enumerated aspects. In some aspects, one or more of the enumerated aspects may be omitted or performed in a different order.

At 1410, a wireless communication device (e.g., a BS 105, 205, or 1100, or a UE 115, 215, or wireless communication device 1200) selects a channel access configuration for transmitting a communication signal in an unlicensed frequency band using a transmission beam, wherein the selecting is based at least in part on a cumulative distribution of first signal measurements at each of a plurality of locations within a first zone or a cumulative distribution of second signal measurements at each of a plurality of locations within a second zone. In some aspects, means for performing the functionality of 1410 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

In certain aspects, wireless communication device may utilize one set of channel access procedures (e.g., without an LBT and/or long-term sensing) for channel access when the transmitting node utilizes a transmission beam that satisfies a narrow beam condition. The wireless communication device may utilize another, different set of channel access procedures for channel access when the wireless communication device utilizes a transmission beam that fails to satisfy the narrow beam condition. That is, narrow-beam based channel access in accordance with the present disclosure can operate based on a narrow transmission beam causing limited interference to surrounding nodes. Accordingly, in some instances one or more metrics may be utilized to determine the narrowness of a transmission beam. The narrowness of a beam as discussed herein may be based on an associated interference level. Accordingly, the narrowness of a beam may not be limited to geometrical properties (e.g., beam width and/or angular sector) of the beam but may also include the interference footprint of the beam on a network level. For instance, a transmission beam with a wider beamwidth, but with a lower gain and/or a lower transmit power may be considered as narrower in terms of its interference to surrounding nodes of the network than a transmission beam with a narrower beamwidth, but with a higher gain and/or higher transmit power in some aspects.

At 1420, a wireless communication device (e.g., a BS 105, 205, or 1100, or a UE 115, 215, or wireless communication device 1200) transmits, based on the channel access configuration and using the transmission beam, the communication signal in the unlicensed frequency band. In some aspects, means for performing the functionality of 1420 can, but not necessarily, include, for instance, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

The wireless communication device may determine whether a narrow beam condition is satisfied. For instance, the wireless communication device may determine whether a beam characteristic of a transmission beam to be used for an upcoming transmission satisfies (e.g., less than) a certain threshold. For instance, techniques for determining whether a wireless communication device (e.g., a BS 105, 205 or a UE 115, 215) satisfies an interference condition (e.g., a narrow beam condition) may be based on a comparison of a cumulative distribution of signal measurements of a transmission beam of the wireless device in an intended zone and a cumulative distribution of signal measurements of a transmission beam of the wireless device in an unintended zone. In some aspects, the wireless communication device may determine whether a beam width (e.g., a half-power beam width) of the beam satisfies a threshold. Additionally or alternatively, the wireless communication device may determine whether a transmit power of the beam satisfies a threshold. For instance, if the transmit power of the beam is less than a threshold value (e.g., less than 10 dBm, less than 15 dBm, less than 20 dBm), then the narrow beam condition may be satisfied. Additionally or alternatively, the wireless communication device may determine whether a beam dwell time or a duty cycle of the beam satisfies a threshold. For instance, the transmission beam may satisfy the narrow beam condition if the beam width is less than a certain threshold in the first and/or second zone, if the transmit power is less than a certain threshold, and/or if the beam dwell time is less than a certain threshold. Conversely, the transmission beam may fail to satisfy the narrow beam condition if the beam width exceeds a certain threshold in the first and/or second zone, if the transmit power exceeds a certain threshold, and/or if the beam dwell time exceeds a certain threshold.

If the narrow beam condition is satisfied, the wireless communication device may utilize a first set of channel access procedures. In some aspects, the first set of channel access procedures may include a channel access without performing an LBT and/or long-term sensing. In some aspects, the first set of channel access procedures may also include various restrictions on the transmission power, the transmission duty cycle, and/or the beam dwell time that the wireless communication device may use.

If, however, the narrow beam condition is not satisfied, the wireless communication device may utilize a second set of channel access procedures. In some aspects, the second set of channel access procedures may include a channel access after a successful LBT and/or a low interference detection from long-term sensing. In some aspects, the first set of channel access procedures may also include various restrictions on the transmission power, the transmission duty cycle, and/or the beam dwell time that the wireless communication device may use.

While utilizing the narrow beam condition may reduce the likelihood of a beam collision, in some instances, a transmission beam may include main lobes and side lobes. For instance, a directional antenna array or elements may have an objective to emit a transmission beam (e.g., RF signals) in a specific direction. However, a directional antenna array or elements may also generate unwanted or undesired radiation in unintended zones and/or directions other than the intended zone and/or direction. That is, the transmission beam may have a main lobe in the intended direction and side lobe(s) in unintended directions. The main lobe may be configured to have a large field strength than the other side lobe(s).

Further aspects of the present disclosure include the following:

Aspect 1 includes a method of wireless communication performed by a first wireless communication device, the method comprising receiving, from a second wireless communication device, one or more signals associated with a beam parameter; determining, for each of a plurality of locations within a first zone, a first signal measurement for the one or more received signals; determining, at each of a plurality of locations within a second zone, a second signal measurement for the one or more received signals, wherein the second zone is different from the first zone; and determining whether the second wireless communication device satisfies an interference condition based at least in part on a cumulative distribution of at least one of the first signal measurements at the plurality of locations within the first zone or a cumulative distribution of at least one of the second signal measurements at the plurality of locations within the second zone.

Aspect 2 includes the method of aspect 1, wherein the determining whether the second wireless communication device satisfies the interference condition is further based at least in part on the cumulative distribution of the at least one of the first signal measurements at the plurality of locations within the first zone and a first reference probability distribution or the cumulative distribution of the at least one of the second signal measurements at the plurality of locations within the second zone and a second reference probability distribution.

Aspect 3 includes the method of any of aspects 1-2, wherein at least one of the first reference probability distribution or the second reference probability distribution satisfies a narrow beam condition.

Aspect 4 includes the method of any of aspects 1-3, wherein at least one of the first zone or the second zone is a spherical zone.

Aspect 5 includes the method of any of aspects 1-4, wherein the determining the signal measurement at each of the plurality of locations within at least one of the first zone or the second zone comprises determining the signal measurement at a respective azimuth angle and a respective elevation angle with respect to the second wireless communication device.

Aspect 6 includes the method of any of aspects 1-5, wherein the determining the signal measurement at each of the plurality of locations within at least one of the first zone or the second zone comprises determining an effective isotropic radiated power (EIRP) for the one or more received signals.

Aspect 7 includes the method of any of aspects 1-6, wherein the determining whether the second wireless communication device satisfies the interference condition comprises at least one of determining whether a k-th percentile signal measurement of the first signal measurements at the plurality of locations within the first zone satisfies a first threshold; or determining whether a p-th percentile signal measurement of the second signal measurements at the plurality of locations within the second zone satisfies a second threshold.

Aspect 8 includes the method of any of aspects 1-7, wherein the first threshold is based on a size of the first zone or the second threshold is based on a size of the second zone.

Aspect 9 includes the method of any of aspects 1-8, wherein the determining whether the second wireless communication device satisfies the interference condition comprises at least one of determining whether a k-th percentile signal measurement of the signal measurements minus an offset at the plurality of locations within the first zone satisfies a first threshold or determining whether a k-th percentile signal measurement of the signal measurements minus the offset at the plurality of locations within the second zone satisfies a second threshold.

Aspect 10 includes the method of any of aspects 1-9, wherein the offset comprises a transmit power of the one or more signals.

Aspect 11 includes the method of any of aspects 1-10, wherein the determining whether the second wireless communication device satisfies the interference condition further comprises determining whether a difference between a k-th percentile signal measurement and a j-th percentile of the signal measurements at the plurality of locations within the first zone satisfies a first threshold, wherein a value of k is greater than a value of j and determining whether an i-th percentile signal measurement of the signal measurements minus an offset at the plurality of locations within the first zone satisfies a second threshold.

Aspect 12 includes the method of any of aspects 1-11, wherein the determining whether the second wireless communication device satisfies the interference condition further comprises determining whether a difference between a k-th percentile signal measurement and a j-th percentile signal measurement at the plurality of locations within the second zone satisfies a first threshold, wherein a value of k is greater than a value of j and determining whether an i-th percentile signal measurement of the signal measurements minus an offset at the plurality of locations within the second zone satisfies a second threshold.

Aspect 13 includes the method of any of aspects 1-12, wherein the determining whether the second wireless communication device satisfies the interference condition further comprises determining whether a difference between a k-th percentile signal measurement and a j-th percentile of the signal measurements at the plurality of locations within the first zone satisfies a first threshold, wherein a value of k is greater than a value of j; determining whether an i-th percentile signal measurement of the signal measurements minus an offset at the plurality of locations within the first zone satisfies a second threshold; determining whether a difference between a y-th percentile signal measurement and a x-th percentile of the signal measurements at the plurality of locations within a second zone satisfies a first threshold, wherein a value of y is greater than a value of x; and determining whether a z-th percentile signal measurement of the signal measurements minus an offset at the plurality of locations within the second zone satisfies a second threshold.

Aspect 14 includes the method of any of aspects 1-13, wherein the determining whether the second wireless communication device satisfies the interference condition further comprises determining whether a difference between a k-th percentile signal measurement of the signal measurements at the plurality of locations within the first zone and a j-th percentile signal measurement of the signal measurements at the plurality of locations within the second zone satisfies a threshold.

Aspect 15 includes a method of wireless communication performed by a first wireless communication device, the method comprising selecting a channel access configuration for transmitting a communication signal in an unlicensed frequency band using a transmission beam, wherein the selecting is based at least in part on a cumulative distribution of first signal measurements at each of a plurality of locations within a first zone; or a cumulative distribution of second signal measurements at each of a plurality of locations within a second zone; and transmitting, based on the channel access configuration and using the transmission beam, the communication signal in the unlicensed frequency band.

Aspect 16 includes the method of aspect 15, wherein at least one of the first zone or the second zone is a spherical zone.

Aspect 17 includes the method of any of aspects 15-16, wherein the selecting the channel access configuration further comprises determining the signal measurement at a respective azimuth angle and a respective elevation angle with respect to the wireless communication device.

Aspect 18 includes the method of any of aspects 15-17, wherein the selecting the channel access configuration further comprises determining an effective isotropic radiated power (EIRP) for at least one of the first signal measurements or the second signal measurements.

Aspect 19 includes the method of any of aspects 15-18, wherein the selecting the channel access configuration further comprises at least one of determining whether a k-th percentile signal measurement of the signal measurements at the plurality of locations within the first zone satisfies a first threshold; or determining whether a p-th percentile signal measurement of the signal measurements at the plurality of locations within the second zone satisfies a second threshold.

Aspect 20 includes the method of any of aspects 15-19, wherein the selecting the channel access configuration further comprises at least one of determining whether a k-th percentile signal measurement of the signal measurements minus an offset at the plurality of locations within the first zone satisfies a first threshold; or determining whether the k-th percentile signal measurement of the signal measurements minus the offset at the plurality of locations within the second zone satisfies a second threshold.

Aspect 21 includes the method of any of aspects 15-20, wherein the selecting the channel access configuration further comprises determining whether a difference between a k-th percentile signal measurement and a j-th percentile of the signal measurements at the plurality of locations within the first zone is greater than a first threshold, wherein a value of k is greater than a value of j; and determining whether an i-th percentile signal measurement of the signal measurements minus an offset at the plurality of locations within the first zone satisfies a second threshold.

Aspect 22 includes the method of any of aspects 15-21, wherein the selecting the channel access configuration further comprises determining whether a difference between a k-th percentile signal measurement and a j-th percentile of the signal measurements at the plurality of locations within the second zone satisfies a first threshold, wherein a value of k is greater than a value of j; and determining whether an i-th percentile signal measurement of the signal measurements minus an offset at the plurality of locations within the second zone satisfies a second threshold.

Aspect 23 includes the method of any of aspects 15-22, wherein the offset comprises a transmit power of the one or more signals.

Aspect 24 includes the method of any of aspects 15-23, wherein the selecting the channel access configuration further comprises determining whether a difference between a k-th percentile signal measurement and a j-th percentile of the signal measurements at the plurality of locations within the first zone satisfies a first threshold, wherein a value of k is greater than a value of j; determining whether an i-th percentile signal measurement of the signal measurements minus an offset at the plurality of locations within the first zone satisfies a second threshold; determining whether a difference between a y-th percentile signal measurement and a x-th percentile of the signal measurements at the plurality of locations within the second zone satisfies a first threshold, wherein a value of y is greater than a value of x; and determining whether a z-th percentile signal measurement of the signal measurements minus an offset at the plurality of locations within the second zone satisfies a second threshold.

Aspect 25 includes the method of any of aspects 15-24, wherein the selecting the channel access configuration further comprises determining whether a difference between a k-th percentile signal measurement of the signal measurements at the plurality of locations within the first zone and a j-th percentile signal measurement of the signal measurements at the plurality of locations within the second zone satisfies a threshold.

Aspect 26 includes the method of any of aspects 15-25, wherein the transmitting the communication signal comprises transmitting, based on the channel access configuration, the communication signal using the transmission beam without performing channel sensing.

Aspect 27 includes a user equipment (UE) comprising a transceiver, a memory, and a processor coupled to the transceiver and the memory, the UE configured to perform any one of aspects 1-14.

Aspect 28 includes a user equipment (UE) comprising a transceiver, a memory, and a processor coupled to the transceiver and the memory, the UE configured to perform any one of aspects 15-26.

Aspect 29 includes a non-transitory computer-readable medium storing one or more instructions for wireless communication, the one or more instructions comprising one or more instructions that, when executed by one or more processors of a user equipment, cause the one or more processors to perform any one of aspects 1-14.

Aspect 30 includes a non-transitory computer-readable medium storing one or more instructions for wireless communication, the one or more instructions comprising one or more instructions that, when executed by one or more processors of a user equipment, cause the one or more processors to perform any one of aspects 15-26.

Aspect 31 includes a user equipment (UE) comprising one or more means to perform any one or more of aspects 1-14.

Aspect 32 includes a user equipment (UE) comprising one or more means to perform any one or more of aspects 15-26.

Information and signals may be represented using any of a variety of different technologies and techniques. For instance, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative aspects and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For instance, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for instance, a list of items prefaced by a phrase such as "at least one of" or "one or more of") indicates an inclusive list such that, for instance, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
   receiving, from a second wireless communication device, one or more signals associated with a beam parameter;
   determining, for each of a plurality of locations within a first zone, a first signal measurement for the one or more received signals;
   determining, at each of a plurality of locations within a second zone, a second signal measurement for the one or more received signals, wherein the second zone is different from the first zone; and
   determining whether the second wireless communication device satisfies an interference condition based at least in part on:
      a cumulative distribution of at least one of the first signal measurements at the plurality of locations within the first zone; or
      a cumulative distribution of at least one of the second signal measurements at the plurality of locations within the second zone;
   wherein the determining whether the second wireless communication device satisfies the interference condition comprises at least one of:
      determining whether a k-th percentile signal measurement of the signal measurements minus an offset at the plurality of locations within the first zone satisfies a first threshold; or
      determining whether a k-th percentile signal measurement of the signal measurements minus the offset at the plurality of locations within the second zone satisfies a second threshold.

2. The method of claim 1, wherein the determining whether the second wireless communication device satisfies the interference condition is further based at least in part on:
   the cumulative distribution of the at least one of the first signal measurements at the plurality of locations within the first zone and a first reference probability distribution; or
   the cumulative distribution of the at least one of the second signal measurements at the plurality of locations within the second zone and a second reference probability distribution.

3. The method of claim 2, wherein the reference probability distribution satisfies a narrow beam condition.

4. The method of claim 1, wherein at least one of the first zone or the second zone is a spherical zone.

5. The method of claim 1, wherein the determining the signal measurement at each of the plurality of locations within at least one of the first zone or the second zone comprises:
   determining the signal measurement at a respective azimuth angle and a respective elevation angle with respect to the second wireless communication device.

6. The method of claim 1, wherein the determining the signal measurement at each of the plurality of locations within at least one of the first zone or the second zone comprises:
   determining an effective isotropic radiated power (EIRP) for the one or more received signals.

7. The method of claim 1, wherein: the first threshold is based on a size of the first zone; or the second threshold is based on a size of the second zone.

8. The method of claim 1, wherein the offset comprises a transmit power of the one or more signals.

9. A method of wireless communication performed by a first wireless communication device, the method comprising:
   receiving, from a second wireless communication device, one or more signals associated with a beam parameter;
   determining, for each of a plurality of locations within a first zone, a first signal measurement for the one or more received signals;
   determining, at each of a plurality of locations within a second zone, a second signal measurement for the one or more received signals, wherein the second zone is different from the first zone; and
   determining whether the second wireless communication device satisfies an interference condition based at least in part on:
      a cumulative distribution of at least one of the first signal measurements at the plurality of locations within the first zone; or
      a cumulative distribution of at least one of the second signal measurements at the plurality of locations within the second zone;
   wherein the determining whether the second wireless communication device satisfies the interference condition further comprises:
      determining whether a difference between a k-th percentile signal measurement and a j-th percentile of the signal measurements at the plurality of locations within the first zone satisfies a first threshold, wherein a value of k is greater than a value of j; and
      determining whether an i-th percentile signal measurement of the signal measurements minus an offset at the plurality of locations within the first zone satisfies a second threshold.

10. A method of wireless communication performed by a first wireless communication device, the method comprising:
   receiving, from a second wireless communication device, one or more signals associated with a beam parameter;
   determining, for each of a plurality of locations within a first zone, a first signal measurement for the one or more received signals;
   determining, at each of a plurality of locations within a second zone, a second signal measurement for the one or more received signals, wherein the second zone is different from the first zone; and
   determining whether the second wireless communication device satisfies an interference condition based at least in part on:
   a cumulative distribution of at least one of the first signal measurements at the plurality of locations within the first zone; or
   a cumulative distribution of at least one of the second signal measurements at the plurality of locations within the second zone;

wherein the determining whether the second wireless communication device satisfies the interference condition further comprises:
determining whether a difference between a k-th percentile signal measurement and a j-th percentile signal measurement at the plurality of locations within the second zone satisfies a first threshold, wherein a value of k is greater than a value of j; and
determining whether an i-th percentile signal measurement of the signal measurements minus an offset at the plurality of locations within the second zone satisfies a second threshold.

11. A method of wireless communication performed by a first wireless communication device, the method comprising:
receiving, from a second wireless communication device, one or more signals associated with a beam parameter;
determining, for each of a plurality of locations within a first zone, a first signal measurement for the one or more received signals;
determining, at each of a plurality of locations within a second zone, a second signal measurement for the one or more received signals, wherein the second zone is different from the first zone; and
determining whether the second wireless communication device satisfies an interference condition based at least in part on:
a cumulative distribution of at least one of the first signal measurements at the plurality of locations within the first zone; or
a cumulative distribution of at least one of the second signal measurements at the plurality of locations within the second zone;
wherein the determining whether the second wireless communication device satisfies the interference condition further comprises:
determining whether a difference between a k-th percentile signal measurement and a j-th percentile of the signal measurements at the plurality of locations within the first zone satisfies a first threshold, wherein a value of k is greater than a value of j;
determining whether an i-th percentile signal measurement of the signal measurements minus an offset at the plurality of locations within the first zone satisfies a second threshold;
determining whether a difference between a y-th percentile signal measurement and a x-th percentile of the signal measurements at the plurality of locations within the second zone satisfies a first threshold, wherein a value of y is greater than a value of x; and
determining whether a z-th percentile signal measurement of the signal measurements minus an offset at the plurality of locations within the second zone satisfies a second threshold.

12. A method of wireless communication performed by a first wireless communication device, the method comprising:
receiving, from a second wireless communication device, one or more signals associated with a beam parameter;
determining, for each of a plurality of locations within a first zone, a first signal measurement for the one or more received signals;
determining, at each of a plurality of locations within a second zone, a second signal measurement for the one or more received signals, wherein the second zone is different from the first zone; and
determining whether the second wireless communication device satisfies an interference condition based at least in part on:
a cumulative distribution of at least one of the first signal measurements at the plurality of locations within the first zone; or
a cumulative distribution of at least one of the second signal measurements at the plurality of locations within the second zone;
wherein the determining whether the second wireless communication device satisfies the interference condition further comprises:
determining whether a difference between a k-th percentile signal measurement of the signal measurements at the plurality of locations within the first zone and a j-th percentile signal measurement of the signal measurements at the plurality of locations within the second zone satisfies a threshold.

13. A method of wireless communication performed by a wireless communication device, the method comprising:
selecting a channel access configuration for transmitting a communication signal in an unlicensed frequency band using a transmission beam, wherein the selecting is based at least in part on:
a cumulative distribution of first signal measurements at each of a plurality of locations within a first zone; or
a cumulative distribution of second signal measurements at each of a plurality of locations within a second zone; and
transmitting, based on the channel access configuration and using the transmission beam, the communication signal in the unlicensed frequency band;
wherein the selecting the channel access configuration further comprises at least one of:
determining whether a k-th percentile signal measurement of the signal measurements minus an offset at the plurality of locations within the first zone satisfies a first threshold; or
determining whether the k-th percentile signal measurement of the signal measurements minus the offset at the plurality of locations within the second zone satisfies a second threshold.

14. A method of wireless communication performed by a wireless communication device, the method comprising:
selecting a channel access configuration for transmitting a communication signal in an unlicensed frequency band using a transmission beam, wherein the selecting is based at least in part on:
a cumulative distribution of first signal measurements at each of a plurality of locations within a first zone; or
a cumulative distribution of second signal measurements at each of a plurality of locations within a second zone; and
transmitting, based on the channel access configuration and using the transmission beam, the communication signal in the unlicensed frequency band;
wherein the selecting the channel access configuration further comprises:
determining whether a difference between a k-th percentile signal measurement and a j-th percentile of the signal measurements at the plurality of locations within the first zone is greater than a first threshold, wherein a value of k is greater than a value of j; and
determining whether an i-th percentile signal measurement of the signal measurements minus an offset at the plurality of locations within the first zone satisfies a second threshold.

15. A method of wireless communication performed by a wireless communication device, the method comprising:
    selecting a channel access configuration for transmitting a communication signal in an unlicensed frequency band using a transmission beam, wherein the selecting is based at least in part on:
    a cumulative distribution of first signal measurements at each of a plurality of locations within a first zone; or
    a cumulative distribution of second signal measurements at each of a plurality of locations within a second zone; and
    transmitting, based on the channel access configuration and using the transmission beam, the communication signal in the unlicensed frequency band;
    wherein the selecting the channel access configuration further comprises:
        determining whether a difference between a k-th percentile signal measurement and a j-th percentile of the signal measurements at the plurality of locations within the second zone satisfies a first threshold, wherein a value of k is greater than a value of j; and
        determining whether an i-th percentile signal measurement of the signal measurements minus an offset at the plurality of locations within the second zone satisfies a second threshold.

16. The method of claim 15 wherein the offset comprises a transmit power of the one or more signals.

17. A method of wireless communication performed by a wireless communication device, the method comprising:
    selecting a channel access configuration for transmitting a communication signal in an unlicensed frequency band using a transmission beam, wherein the selecting is based at least in part on:
    a cumulative distribution of first signal measurements at each of a plurality of locations within a first zone; or
    a cumulative distribution of second signal measurements at each of a plurality of locations within a second zone; and
    transmitting, based on the channel access configuration and using the transmission beam, the communication signal in the unlicensed frequency band;
    wherein the selecting the channel access configuration further comprises:
        determining whether a difference between a k-th percentile signal measurement and a j-th percentile of the signal measurements at the plurality of locations within the first zone satisfies a first threshold, wherein a value of k is greater than a value of j;
        determining whether an i-th percentile signal measurement of the signal measurements minus an offset at the plurality of locations within the first zone satisfies a second threshold;
        determining whether a difference between a y-th percentile signal measurement and a x-th percentile of the signal measurements at the plurality of locations within the second zone satisfies a first threshold, wherein a value of y is greater than a value of x; and
        determining whether a z-th percentile signal measurement of the signal measurements minus an offset at the plurality of locations within the second zone satisfies a second threshold.

18. A method of wireless communication performed by a wireless communication device, the method comprising:
    selecting a channel access configuration for transmitting a communication signal in an unlicensed frequency band using a transmission beam, wherein the selecting is based at least in part on:
    a cumulative distribution of first signal measurements at each of a plurality of locations within a first zone; or
    a cumulative distribution of second signal measurements at each of a plurality of locations within a second zone; and
    transmitting, based on the channel access configuration and using the transmission beam, the communication signal in the unlicensed frequency band;
    wherein the selecting the channel access configuration further comprises:
        determining whether a difference between a k-th percentile signal measurement of the signal measurements at the plurality of locations within the first zone and a j-th percentile signal measurement of the signal measurements at the plurality of locations within the second zone satisfies a threshold.

19. A first wireless communication device comprising:
    a memory;
    a transceiver; and
    at least one processor coupled to the memory and the transceiver, wherein the first wireless communication device is configured to:
        receive, from a second wireless communication device, one or more signals associated with a beam parameter;
        determine, for each of a plurality of locations within a first zone, a first signal measurement for the one or more received signals;
        determine, at each of a plurality of locations within a second zone, a second signal measurement for the one or more received signals, wherein the second zone is different from the first zone; and
        determine whether the second wireless communication device satisfies an interference condition based at least in part on:
            a cumulative distribution of at least one of the first signal measurements at the plurality of locations within the first zone; or
            a cumulative distribution of at least one of the second signal measurements at the plurality of locations within the second zone;
        wherein the at least one processor is further configured to determine whether the second wireless communication device satisfies the interference condition based at least in part on:
            determining whether a k-th percentile signal measurement of the signal measurements minus an offset at the plurality of locations within the first zone satisfies a first threshold; or
            determining whether a k-th percentile signal measurement of the signal measurements minus the offset at the plurality of locations within the second zone satisfies a second threshold.

* * * * *